United States Patent
Thommana et al.

(10) Patent No.: US 12,501,339 B2
(45) Date of Patent: Dec. 16, 2025

(54) JOINT OPTIMIZATION OF FREQUENCY AND RELAY SELECTION FOR RESILIENT HF COMMUNICATION

(71) Applicant: Rockwell Collins, Inc., Cedar Rapids, IA (US)

(72) Inventors: John V. Thommana, Cedar Rapids, IA (US); Joseph Splean, II, Ely, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 357 days.

(21) Appl. No.: 18/133,842

(22) Filed: Apr. 12, 2023

(65) Prior Publication Data

US 2024/0340757 A1    Oct. 10, 2024

Related U.S. Application Data

(63) Continuation-in-part of application No. 18/130,687, filed on Apr. 4, 2023.

(51) Int. Cl.
*H04W 4/00* (2018.01)
*H04W 40/02* (2009.01)
(Continued)

(52) U.S. Cl.
CPC ....... *H04W 40/02* (2013.01); *H04W 72/0453* (2013.01); *H04W 72/541* (2023.01)

(58) Field of Classification Search
CPC ............. H04W 40/02; H04W 72/0453; H04W 72/541; H04W 16/20; H04W 40/12;
(Continued)

(56) References Cited

U.S. PATENT DOCUMENTS

| | | |
|---|---|---|
| 5,768,697 A | 6/1998 | Shirakawa |
| 7,092,402 B1 | 8/2006 | Smith et al. |

(Continued)

FOREIGN PATENT DOCUMENTS

| | | |
|---|---|---|
| EP | 3855642 A1 | 7/2021 |
| EP | 4443749 A1 | 10/2024 |

OTHER PUBLICATIONS

"Interoperability and Performance Standards for Data Modems," Pub.No. MIL-STD-188-110D; DOD Interface Standard, published Dec. 29, 2017.

(Continued)

*Primary Examiner* — Phuongchau Ba Nguyen
(74) *Attorney, Agent, or Firm* — Suiter Swantz IP

(57) ABSTRACT

Techniques for selecting frequencies of operation are described. HF signals may land at the receiver node with power levels dependent upon the transmit frequency. The frequency with the highest power level at the receiver node may be selected when the receiver node is not subject to interference. The receiver node may be unable to receive a desired signal if an interfering signal has a signal level which is higher than the desired signal. The interfering signals may have a signal level which is higher across all available frequencies. The transmitter node may determine a potential relay table with a communication link between the transmitter node and a relay node and a communication link between the relay node and the receiver node. The communication link may include link margins above the interfering signal, ensuring the links may be established. The nodes may then communicate even when subject to interference.

10 Claims, 24 Drawing Sheets

(51) Int. Cl.
*H04W 72/0453* (2023.01)
*H04W 72/541* (2023.01)

(58) Field of Classification Search
CPC ..... H04W 40/16; H04W 40/22; H04W 28/04; H04W 72/04; H04W 72/042; H04W 88/08; H04W 28/08; H04W 28/084; H04W 36/22; H04W 72/12; H04L 5/0007
See application file for complete search history.

(56) References Cited

U.S. PATENT DOCUMENTS

| | | |
|---|---|---|
| 8,311,488 B2 | 11/2012 | Furman et al. |
| 9,008,594 B2 | 4/2015 | Lamy-Bergot et al. |
| 9,094,088 B2 | 7/2015 | Baqar et al. |
| 9,282,500 B1 | 3/2016 | Thommana et al. |
| 10,051,606 B1 | 8/2018 | Nelson et al. |
| 10,116,382 B1 | 10/2018 | Thommana et al. |
| 10,251,083 B2 | 4/2019 | Thommana et al. |
| 10,693,683 B1 | 6/2020 | Nelson et al. |
| 11,309,954 B2 | 4/2022 | Babich |
| 11,425,605 B1 | 8/2022 | Cheng |
| 11,451,291 B2 | 9/2022 | Thommana et al. |
| 11,490,452 B2 | 11/2022 | Thommana et al. |
| 12,388,480 B2 * | 8/2025 | Thommana .............. H04B 7/22 |
| 2013/0307715 A1 | 11/2013 | Davis et al. |
| 2016/0212683 A1 | 7/2016 | Freeman |
| 2021/0159946 A1 | 5/2021 | Raghavan et al. |
| 2022/0271813 A1 * | 8/2022 | Kompala .............. H04B 7/086 |
| 2023/0092997 A1 | 3/2023 | Mody et al. |
| 2024/0340757 A1 | 10/2024 | Thommana et al. |
| 2025/0165012 A1 * | 5/2025 | Parzysz .................. G08G 5/59 |

OTHER PUBLICATIONS

Department of Defense Interface Standard, "Interoperability and Performance Standards for Data Modems," MIL-STD-188-110D, Dec. 29, 2017.

Elbanhawi et al., "Enabling technologies for autonomous MAV operations," Progress in Aerospace Sciences, Mar. 30, 2017, 26 pages.

European Patent Office, Extended European Search Report received in EP Application No. 24166015.8, Jul. 26, 2024, 8 pages.

European Patent Office, Extended European Search Report received in EP Application No. 24168083.4, Aug. 6, 2024, 16 pages.

* cited by examiner

620

622
Determine LUF and MUF from (TX/INT) to RX

624
Determine propagation loss from (TX/INT) to RX for each frequency

626
Determine received power at RX of signal from (TX/INT) for each frequency

| FREQUENCY TABLE |
|---|
| F(1) |
| F(2) |
| ... |
| F(N-1) |
| F(N) |

402a-c

|  | Position |
|---|---|
| TX | (lat, long) |
| INT(1) | (lat, long) |
| INT(2) | (lat, long) |
| ... | ... |
| INT(M) | (lat, long) |
| RX | (lat, long) |

FIG. 7A 404a, b

|          | F(1) | F(2) | ... | F(N-1) | F(N) |
|----------|------|------|-----|--------|------|
| TX EIRP  | dBm  | dBm  | ... | dBm    | dBm  |
| INT(1) EIRP | dBm | dBm | ... | dBm   | dBm  |
| INT(2) EIRP | dBm | dBm | ... | dBm   | dBm  |
| ...      | ...  | ...  | ... | ...    | ...  |
| INT(M) EIRP | dBm | dBm | ... | dBm   | dBm  |

FIG. 7B 504, 506, 508

|  | LUF | MUF | Prop. Loss at F(1) | Prop. Loss at F(2) | ... | Prop. Loss at F(N-1) | Prop. Loss at F(N) |
|---|---|---|---|---|---|---|---|
| TX to RX | MHz | MHz | dB | dB | ... | dB | dB |
| INT (1) to RX | MHz | MHz | dB | dB | ... | dB | dB |
| INT (2) to RX | MHz | MHz | dB | dB | ... | dB | dB |
| ... | ... | ... | ... | ... | ... | ... | ... |
| INT (M) to RX | MHz | MHz | dB | dB | ... | dB | dB |

|  | Rcv'd Power at F(1) | Rcv'd Power at F(2) | ... | Rcv'd Power at F(N-1) | Rcv'd Power at F(N) |
|---|---|---|---|---|---|
| TX to RX | dBm | dBm | ... | dBm | dBm |
| INT (1) to RX | dBm | dBm | ... | dBm | dBm |
| INT (2) to RX | dBm | dBm | ... | dBm | dBm |
| ... | ... | ... | ... | ... | ... |
| INT (M) to RX | dBm | dBm | ... | dBm | dBm |

FIG. 7D

704                                                                Discarded: ▨

| | Rcv'd Power at F(1) | Rcv'd Power at F(2) | ... | Rcv'd Power at F(N-1) | Rcv'd Power at F(N) |
|---|---|---|---|---|---|
| TX to RX | F(1) Below TX to RX LUF | dBm | ... | dBm | F(N) above TX to RX MUF |
| INT (1) to RX | F(1) Below TX to RX LUF | dBm | ... | dBm | F(N) above TX to RX MUF |
| INT (2) to RX | F(1) Below TX to RX LUF | dBm | ... | F(N-1) above INT(2) to RX MUF | F(N) above TX to RX MUF |
| ... | ... | ... | ... | ... | ... |
| INT (M) to RX | F(1) Below TX to RX LUF | dBm | ... | dBm | F(N) above TX to RX MUF |

FIG. 7E

706  Discarded:

|  | F(1) | F(2) | ... | F(N-1) | F(N) |
|---|---|---|---|---|---|
| RX Sensitivity | F(1) Below TX to RX LUF | dBm | ... | dBm | F(N) above TX to RX MUF |

_708_  Discarded: ▨

| | Rcv'd Power at F(1) | Rcv'd Power at F(2) | ... | Rcv'd Power at F(N-1) | Rcv'd Power at F(N) |
|---|---|---|---|---|---|
| TX to RX | F(1) Below TX to RX LUF | TX to RX Rcv'd power below RX Sens. | ... | dBm | F(N) above TX to RX MUF |
| INT (1) to RX | F(1) Below TX to RX LUF | TX to RX Rcv'd power below RX Sens. | ... | dBm | F(N) above TX to RX MUF |
| INT (2) to RX | F(1) Below TX to RX LUF | TX to RX Rcv'd power below RX Sens. | ... | F(N-1) above INT(2) to RX MUF | F(N) above TX to RX MUF |
| ... | ... | ... | ... | ... | ... |
| INT (M) to RX | F(1) Below TX to RX LUF | TX to RX Rcv'd power below RX Sens. | ... | dBm | F(N) above TX to RX MUF |

| Frequency | F(3) | F(4) | ... | F(N-2) | F(N-1) |
|---|---|---|---|---|---|
| Link Margin | dB | dB | ... | dB | dB |

810
Split short listed frequency table into primary list and secondary list based on interferer MUF

820
Sort primary list and secondary list based on link margin

832
Append secondary list to primary list

834
Append primary list to secondary list

1110
Direct Communication unavailable between transmitter node and receiver node

1120
Direct Communication Analysis between relay node and receiver node

1130
Direct Communication Analysis between transmitter node and relay node

1140
Sort Potential Relay Table

1150
Establish Communication Links

FIG. 11

1202                                                                  Discarded: ☐

| | Link Margin at F(1) | Link Margin at F(2) | ... | Link Margin at F(N-1) | Link Margin at F(N) |
|---|---|---|---|---|---|
| RLY(1) to RX | F(1) Below RLY(1) to RX LUF | RLY(1) to RX Rcv'd power below RX Sens. | ... | dBm | F(N) above RLY(1) to RX MUF |
| RLY(2) to RX | F(1) Below RLY(2) to RX LUF | dBm | ... | dBm | F(N) above RLY(2) to RX MUF |
| ... | ... | ... | ... | ... | ... |
| RLY(M-1) to RX | F(1) Below RLY(M-1) to RX LUF | dBm | ... | RLY(M-1) to RX Rcv'd power below INT | F(N) above RLY(M-1) to RX MUF |
| RLY(M) to RX | F(1) Below RLY(M) to RX LUF | RLY(M) to RX Rcv'd power below RX Sens. | ... | dBm | F(N) above RLY(M-1) to RX MUF |

| Link 1004 | Link 1004 Margin | Link 1006 | Link 1006 Margin |
|---|---|---|---|
| TX to RLY(1) at F(2) | dB | RLY(1) to RX at F(N-1) | dB |
| TX to RLY(N-1) at F(N-1) | dB | RLY(N-1) to RX at F(2) | dB |

| 1310 Determine link margin deficit |

| 1320 Reduction in range overcoming link margin deficit |

| 1330 Position of relay node |

| 1340 Communication analysis for relay links |

| 1350 End-to-end communication using relay links |

1320

JOINT OPTIMIZATION OF FREQUENCY AND RELAY SELECTION FOR RESILIENT HF COMMUNICATION

CROSS-REFERENCE TO RELATED APPLICATION

The present application is a Continuation-In-Part of U.S. application Ser. No. 18/130,687, titled FREQUENCY SELECTION ALGORITHM FOR RESILIENT HF COMMUNICATION, filed Apr. 4, 2023, which is incorporated herein by reference in the entirety.

TECHNICAL FIELD

The present invention generally relates to communication systems, and more specifically to resilient and resistant HF communication.

BACKGROUND

Radio Frequency (RF) communication provide long-range communication for a plurality of stationary and moving nodes (stations). High Frequency (HF) waveforms may possess qualities specifically suited for long range communication. However, the HF waveforms are not designed to operate during periods of active denial and intentional/unintentional interference. The long-range communication can then be denied by the active intentional and unintentional interference. Therefore, it would be advantageous to provide a device, system, and method that cures the shortcomings described above.

SUMMARY

A software-defined radio is described in accordance with one or more embodiments of the present disclosure. In some embodiments, the software-defined radio includes a memory maintaining program instructions. In some embodiments, the software-defined radio includes one or more processors configured to execute the program instructions. In some embodiments, the program instructions cause the one or more processors to implement one or more methods. The methods may include a method of selecting relay nodes and frequencies. The method may also include a method of placing relay nodes.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 6A-6B depicts a flow diagram of a method, in accordance with one or more embodiments of the present disclosure.

FIG. 7A depicts a frequency table and node positions, in accordance with one or more embodiments of the present disclosure.

FIG. 7B depicts node Effective Isotropic Radiated Powers (EIRPs), in accordance with one or more embodiments of the present disclosure.

FIG. 7C depicts lowest useable frequencies (LUFs), maximum useable frequencies (MUFs), and propagation losses between nodes, in accordance with one or more embodiments of the present disclosure.

FIG. 7D depicts received powers between nodes, in accordance with one or more embodiments of the present disclosure.

FIG. 7E depicts discarding frequencies below a LUF and above a MUF between a transmitter node and a receiver node, in accordance with one or more embodiments of the present disclosure.

FIG. 7G depicts discarding frequencies with a signal from a transmitter node to a receiver node below a receive sensitivity, in accordance with one or more embodiments of the present disclosure.

FIG. 7H depicts a short-listed frequency table, in accordance with one or more embodiments of the present disclosure.

FIG. 8 depicts a flow diagram of a method, in accordance with one or more embodiments of the present disclosure.

FIG. 11 depicts a flow diagram of a method of selecting nodes to relay HF communication, in accordance with one or more embodiments of the present disclosure.

FIG. 12A depicts an exemplary potential relay table, in accordance with one or more embodiments of the present disclosure.

FIG. 12B depicts an exemplary potential route table, in accordance with one or more embodiments of the present disclosure.

DETAILED DESCRIPTION OF THE INVENTION

Figure 1:
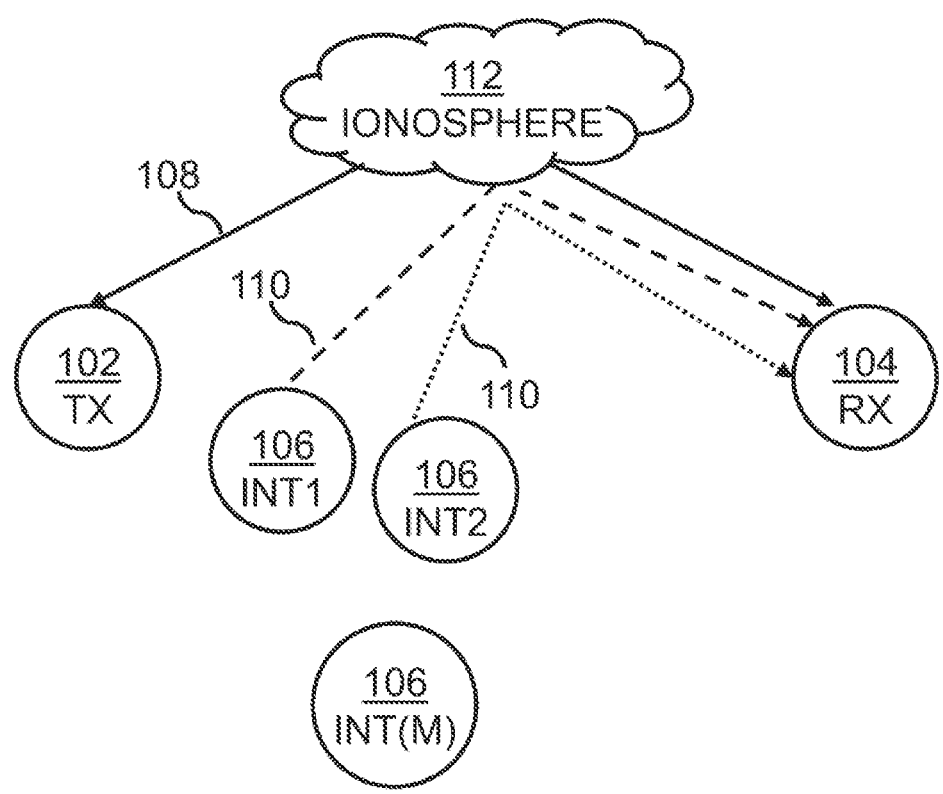
FIG. 1 depicts a system including a transmitter node, a receiver node, and interferer nodes, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally now to one or more embodiments of the present disclosure. Embodiments of the present disclosure are generally directed to a system and method that enables HF waveforms to operate in environment subject to interfering. A communication link budget with potential interferer link budgets is iteratively computed. A frequency is then selected that can overcome interfering from each interferer.

Embodiments of the present disclosure are also directed to selecting HF relays and/or placing HF relays between two or more HF nodes. The HF relays are selected and/or placed such that there exists one or more frequencies that which propagate for forming a relay connection between the two or more HF nodes via the HF relay. The methods may enable planning a set of relays between nodes such that there exists one or more frequencies and relays suitably placed to overcome the interfering signals 110.

U.S. Pat. No. 9,282,500, titled "Ad hoc high frequency with advanced automatic link establishment system and related method", filed on Jun. 17, 2014; U.S. Pat. No. 10,116,382, titled "Ad hoc high frequency network", filed on Feb. 24, 2017; and U.S. Pat. No. 11,490,452, titled "Ad-hoc HF time frequency diversity", filed on Jan. 20, 2020; are incorporated herein by reference in the entirety.

Referring now to FIG. 1, a system 100 is described, in accordance with one or more embodiments of the present disclosure. The system 100 may also be referred to as a communication network, a high frequency (HF) communication network, and/or a beyond line-of-sight (BLOS) communication network.

The system 100 may include one or more nodes, such as, but not limited to, transmitter nodes 102, receiver nodes 104, interferer nodes 106, and the like.

The transmitter nodes 102 and the receiver nodes 104 may be considered a network of nodes. The transmitter nodes 102 may also function as receiver nodes 104, and vice versa. The transmitter nodes 102 and the receiver nodes 104 may include a common mission and may desire to establish communication. The transmitter node 102 may be considered a node which transmits for the purpose of communication. The nodes may switch between being the transmitter node 102 and the receiver node 104 during bidirectional communication.

The transmitter nodes 102 and the receiver nodes 104 may establish a communication link 108. The communication link 108 may enable communication between the transmitter nodes 102 and the receiver nodes 104. For example, the transmitter nodes 102 may transmit a waveform to the receiver nodes 104 to establish the communication link 108. The communication link 108 may be a connection between the nodes enabling transfer of data over the waveform in space.

The communication link 108 may refer to a beyond line-of-sight communication link in a high frequency (HF) band. The HF band may include a frequency range from 2 MHz to 30 MHz. For example, the waveform may follow a path. The path may refer to a physical path the waveform travels in space between nodes. The waveform may be transmitted from the transmitter node 102, reflected from the ionosphere 112, and received by the receiver node 104.

The transmitter nodes 102 and the receiver nodes 102 may include a frequency table (e.g., frequency table 406). The frequency table may include a plurality of frequencies (F) in the HF band. The frequency table may include any number (N) of the frequencies in the HF band. For example, the frequency table may commonly include ten or more frequencies (F1-F10) in the HF band, although this is not intended as a limitation of the present disclosure. It is contemplated that the frequency table may include hundreds or more of frequencies in the HF band. The transmitter nodes 102 and the receiver nodes 104 may use any of the frequencies to establish the communication link 108.

The system 100 may also include intentional/unintentional interferer nodes 106. The interferer nodes 106 may be considered a node which communicates for the purpose of intentionally or unintentionally interfering communication from other nodes. The interferer nodes 106 may be located at various positions on earth. The interferer nodes 106 may include directional antennas and/or omnidirectional antennas operable in the HF band. The antennas of the interferer nodes 106 may deliver a given Effective Isotropic Radiated Power (EIRP). The EIRP may indicate the transmit power leaving an antenna. The EIRP may account for the impact of the transmitter and the antenna. For example, an antenna gain parameter may be ignored using the EIRP.

The position and/or the EIRP of the interferer nodes 106 may be known by the transmitter nodes 102 and/or the receiver nodes 104. For example, the interferer nodes 106 may be located at a fixed position (e.g., fixed-site interferer nodes). For example, the fixed-site interferer nodes may have restrictions in changing EIRP such that the EIRP may be determined a priori. The fixed-site interferer nodes are also located at a fixed position or site which is detectable by satellite or another method. The position and EIRP of the interferer nodes 106 may then be provided to the transmitter nodes 102 and/or the receiver nodes 104.

The fixed-site interferer nodes may achieve a high Effective, Isotropic Radiated Power (EIRP) in the high frequency (HF) band. A high EIRP in the HF band may refer to 1 kW or more. Interferer nodes which are mobile are not as powerful as fixed site interferers. For example, the EIRP of the mobile interferer nodes may be limited by antenna size and antenna gain due to the size of the platform hosting the antenna. The low EIRP of the mobile interferer nodes may reduce the effectiveness of interfering BLOS communications.

The interferer node 106 may transmit a signal 110 to the receiver node 104 intentionally or unintentionally on the same frequency as the signal from the transmitter node 102. The interfering signal 110 may increase a noise level at the receiver node 104, or similarly decrease a signal-to-noise ratio of the communication link 108. The interfering signal 110 may then cause the receiver node to be unable to hear the signal transmitted from the transmitter node 102. Thus, ensuring the receiver node 104 receives the communication link 108 in the HF band while being subject to the interfering signal 110 by interferer nodes is desirable.

The communication link 108 may reflect from the ionosphere 112 in one or more hops between the transmitter nodes 102 and the receiver nodes 104. Similarly, the interfering signal 110 may reflect from the ionosphere 112 in one or more hops from the interferer nodes 106 to the receiver nodes 104. For example, the communication link 108 and interfering signal 110 may reflect from any of the layers (e.g., E layer, F layer) of the ionosphere 112 in one hop or multiple hops before being received by the receiver nodes 104.

The propagation of HF signals reflected from the ionosphere 112 may be dependent on one or more factors, such as, but not limited to, the time of the day, the season of the year. the sunspot number, ionospheric conditions, transmit power, and the like. The ionospheric conditions may change drastically during solar flares, coronal mass ejections, and manmade scintillation environments. Thus, there is no guarantee that any frequency in the HF band will work for communication between each of the nodes of the system 100. The time of day, sunspot number, and ionospheric conditions may be the same for each node in the network at a given date and time. The distance and transmit power may vary for each node in the network.

The probability of the communication link 108 from the transmitter node 102 being received by the receiver node 104 may be low when the receiving nodes 104 are subject to the interfering signal 110. In embodiments, the transmitter nodes 102 may account for the interfering signal 110 when determining a transmit frequency. The transmitter node may pick a frequency that the transmitter node and receiver node may use to communicate which the interferers cannot employ.

Figure 2:
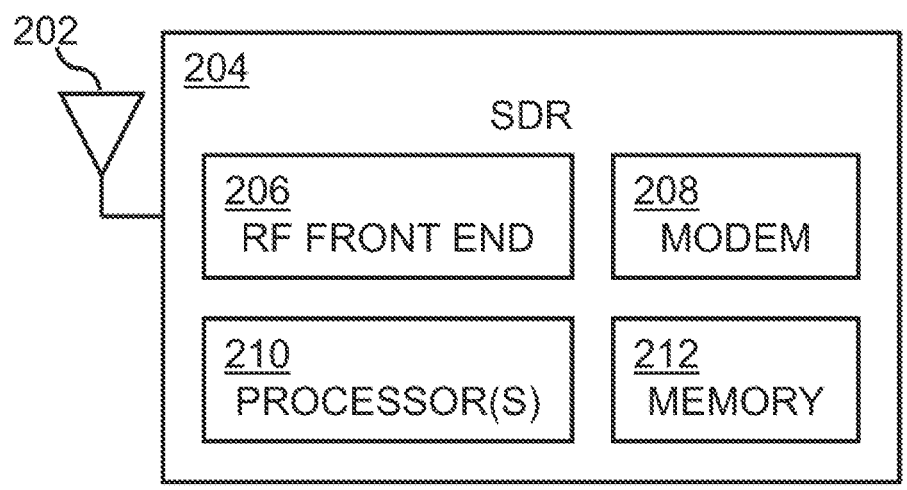
FIG. 2 depicts a simplified block diagram of a node including an antenna and a software-defined radio, in accordance with one or more embodiments of the present disclosure.

Referring now to FIG. 2, a node 200 is described, in accordance with one or more embodiments of the present disclosure. The node 200 may be an example of the transmitter node 102 and/or the receiver node 104. The node 200 may include one or more antennas 202 and software-defined radio 204 (SDR).

The software-defined radio 204 may include one or more components, such as, but not limited to, a radio frequency (RF) front end 206, modem 208, processors 210, memory 212, and the like. As may be understood, the software-defined radio 204 may include a number of components, permutations, and arrangements, which are not set forth herein for clarity.

The antennas 202 may provide an interface between the HF radio waves (e.g., the communication link 108) and an RF electrical signal. The antennas 202 be coupled to the software-defined radio 204. For example, the antennas 202 may be coupled to the software-defined radio 204 by one or more switches (not depicted), although this is not intended to be limiting. The antennas 202 may be coupled to RF front end 206 of the of the software-defined radio 204.

The RF front end 206 may provide one or more functions, such as, but not limited to, process the RF electrical signal. For example, the RF front end 206 may perform frequency up conversion, frequency down conversion, filtering, amplification, signal mixing, and the like.

The modem 208 may provide one or more functions, such as, but not limited to, modulation and/or demodulation functions. For example, the modem 208 may modulate signals to the RF front end 206 and/or demodulate signals from the RF front end 206.

The software-defined radio 204 may include functionality defined by software. The software-defined radio 204 may include signal processing functionality defined in software, for generating a waveform as sampled digital signals, converting from digital to analog via high-speed Digital-to-Analog Converter (DAC), and then translating to Radio Frequency (RF) for wireless propagation to a receiver. For example, the memory 212 may maintain program instructions. The program instructions may provide the various functionality. The program instructions may be executable by the processors 210 for performing any of the various methods described herein. The processors 210 may also be coupled to the modem 208. The modem 208 may then provide an interface for modulating and demodulating the waveform with data. In this regard, the processors 210 and modem 208 may host one or more portions layers of a waveform protocol stack. In embodiments, the software-defined radios 204 may host a waveform protocol stack 300.

Figure 3:
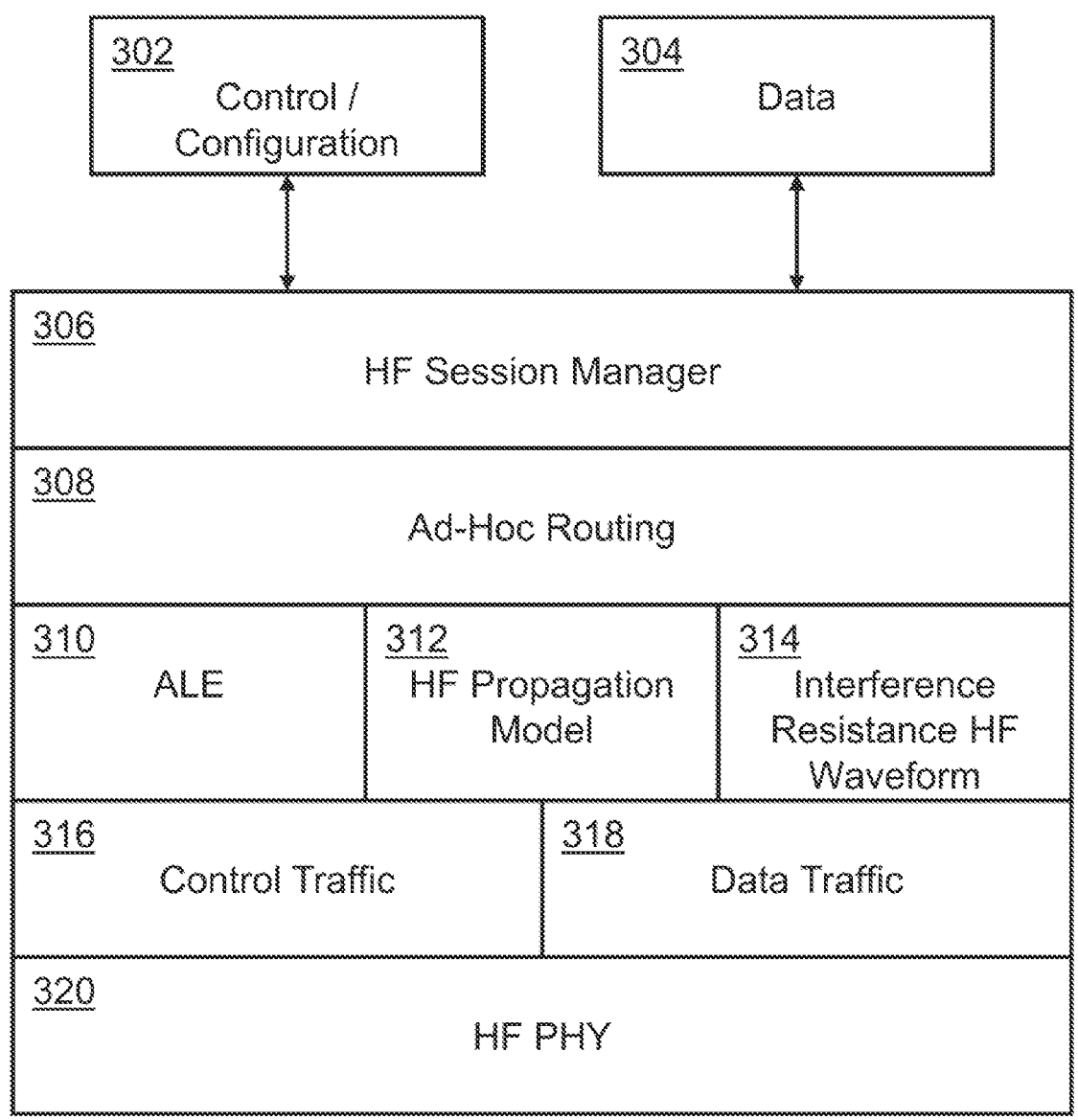
FIG. 3 depicts an interference resistant HF waveform, in accordance with one or more embodiments of the present disclosure.

Referring now to FIG. 3, a waveform protocol stack 300 is described, in accordance with one or more embodiments of the present disclosure. The node 200 may use the waveform protocol stack 300 to establish the communication link 108 when the receiver node 104 is subject to the interfering signal 110. The waveform protocol stack 300 may also be referred to as an HF waveform protocol stack, an ad-hoc waveform protocol stack, a resilient waveform protocol stack, a resistant ad-hoc HF waveform protocol stack, or the like.

The waveform protocol stack 300 may include one or more layers. A layer of the waveform protocol stack 300 may include control/configuration 302 and data 304.

Another layer of the waveform protocol stack 300 may include an HF session manager 306. The HF Session Manager 140 may perform various functions to setup and tear down the communication link 108 between nodes. In embodiments, the HF session manager 306 may operate automatic link establishment 310 (ALE), HF propagation model 312, and HF waveform 314 in a time-shared mode.

Another layer of the waveform protocol stack 300 may include an ad-hoc routing function 308. Ad-hoc may refer to data forwarding across a wireless network. The nodes in the wireless network may be mobile, such that routing must be performed ad hoc. The ad-hoc routing function 308 may include, but is not limited to, an Optimized Link State Routing Protocol (OLSR) or the like.

Another layer of the waveform protocol stack 300 may include an automatic link establishment 310 (ALE), a HF propagation model 312, and a resilient HF waveform 314. In embodiments, the waveform protocol stack 300 may simultaneously perform the automatic link establishment 310, the HF propagation model 312, and the HF waveform 314 without disrupting the communication link 108.

The automatic link establishment 310 may include sounding, call, and answer messages to enable ad-hoc HF. For example, the automatic link establishment 310 may sound a channel. Peer nodes may then record a link quality of the communication link 108 and order frequencies of the communication link 108 in descending order of link quality. The nodes 200 may use the frequency with the highest available link quality to communicate. A rate of the sounding may be selected based on a time or a speed or a change in position of the nodes. The automatic link establishment 310 may include, but is not limited to, sounding in accordance with MIL-STD-188-141 D (ALE), although this is not intended to be limiting.

The messages in the automatic link establishment 310 may include various data regarding the nodes, such as, but not limited to, node identity (ID), position, velocity, frequency received, link quality, and the like.

Nodes may cycle through and transmit the sounding burst for each frequency in a frequency table. The other nodes may or may not receive the sounding burst. If the nodes do receive the sounding burst, the nodes record that the sounding burst from the transmitter node 102 was received at the selected frequency and with a given link quality. The nodes may then determine frequencies which propagate between the transmitter nodes 102 and the receiver nodes 104. If a node desires to initiate a call, the node sends a call request using the frequency with the best link quality. The nodes may then negotiate call parameters, bandwidth, data rate, and the like for establishing the communication link 108.

The sounding bursts may be transmitted in a manner which is unpredictable. In this regard, the sounding bursts may include a low-probability of being interfered. The nodes may initiate the communication link 108 using a frequency selected based link quality sent over the sounding signals. The interferer nodes 106 may initiate the interfering signals 110 during the communication link 108 at the current frequency of the communication link 108. The noise from the interfering signals 110 may prevent the receiver nodes 104 from receiving the desired signals above a receiver sensitivity, such that the communication link 108 is broken. For example, the nodes may establish the call parameters. The interferer nodes 106 may then interfere with the receiver node 104 subsequent to the nodes establishing the call parameters. The transmitter node 102 may be aware of the lost communication but unaware of the interfering signal 110.

In embodiments, the waveform protocol stack 300 may implement a frequency selection algorithm. The frequency selection algorithm selects frequencies which maintain the communication link 108 in the presence of the interfering signal 110.

The HF propagation model 312 may be in a same layer as the automatic link establishment 310. The HF propagation model 312 may model the propagation of HF signals in various conditions. The HF propagation model 312 may also be referred to as a coverage analysis program. The HF propagation model 312 may include any propagation model, such as, but not limited to, Voice of America Coverage Analysis Program (VOACAP), PropMan™ 2000, and the like. The HF propagation model 312 is further described with reference to FIG. 5.

The HF waveform 314 may be in the same layer as the HF propagation model 312 and the automatic link establishment 310. The HF waveform 314 may provide continuous maintenance of the communication link 108 and/or the HF waveform to and from nodes of the system 100.

Another layer of the waveform protocol stack 300 may include control traffic 316 and data traffic 318. The control traffic 316 may be packetized and sent on a control plane. The data traffic 318 may be packetized and sent on a data plane. Both the control traffic 316 and the data traffic 318 are packetized and transported over the same link by interspersing the packets. Traffic other than the actual data being transported can be characterized as control traffic 316. For example, the control traffic 316 may include sounding packets or routing packets.

Another layer of the waveform protocol stack 300 may include an HF physical layer 320 (HF PHY). The HF physical layer 320 may refer to the signal in space (e.g., the communication link 108) transmitted and/or received by the antenna 202. The HF physical layer 320 may be a time-division multiple access (TDMA) HF waveform.

In embodiments, the waveform protocol stack 300 may be considered denial resistant or resilient. The waveform protocol stack 300 may be operable beyond line-of-sight in an environment subject to interfering. The ability to operate the waveform protocol stack 300 in the interfering environment is desirable to ensure beyond line-of-sight (BLOS) communications between nodes. In embodiments, the waveform may include a level of robustness that is able to operate in an interfering environment. In particular, the waveform may be operable in an interfering environment which is subject to interference from interferers (e.g., interferer nodes 106) with a high EIRP in the HF band.

The waveform protocol stack 300 may be significantly more robust than existing HF waveforms. For example, the waveform protocol stack 300 may be more robust than the waveforms described in MIL-STD-188-110D. The most robust modes of MIL-STD-188-110D are the Walsh modes. The Walsh mode waveforms have a robustness similar to that of STANAG 4415. Walsh mode waveforms of MIL-STD-188-110D may not be sufficiently robust to counter the intentional interferer nodes. The existing set of Walsh modes waveforms are not robust enough to operate under extreme solar anomalies and/or active interfering conditions. In embodiments, the HF waveform 314 is more robust than waveform number 0 Walsh Mode defined MIL-STD-188-110D, although this is not intended to be limiting.

The waveform protocol stack 300 may also operate under a wide variety of delay spreads and Doppler spreads typically seen under normal/moderately disturbed ionospheric conditions worldwide.

Figure 4:
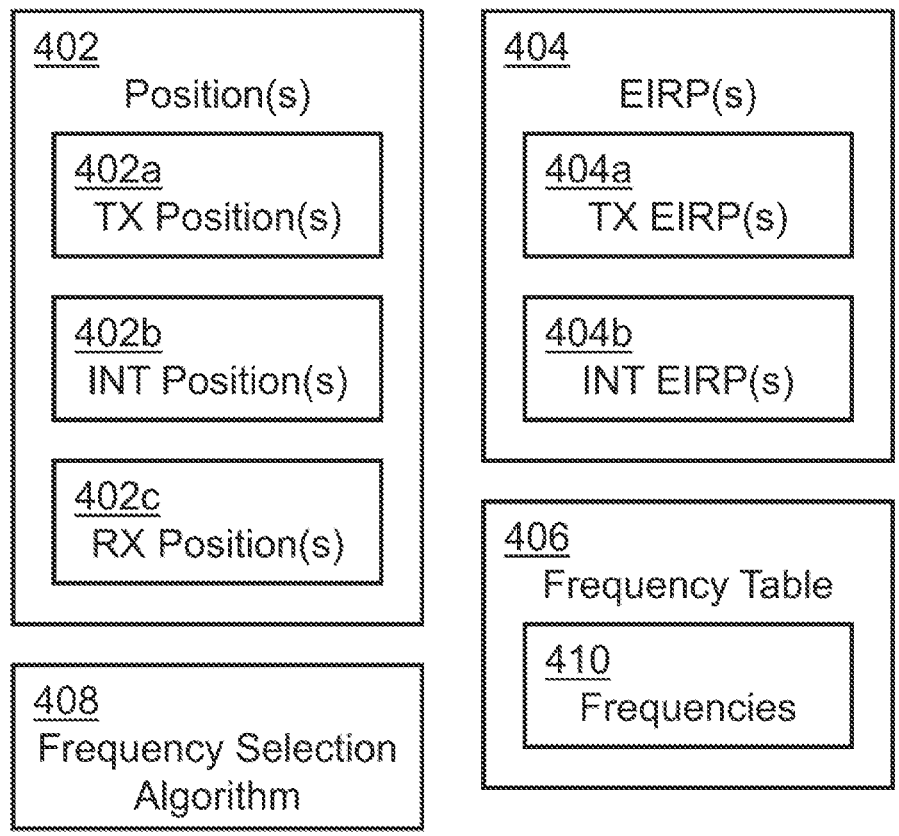
FIG. 4 depicts a simplified block diagram of a memory, in accordance with one or more embodiments of the present disclosure.

Referring now to FIG. 4, the memory 212 is described, in accordance with one or more embodiments of the present disclosure. The memory 212 may include positions 402, EIRPs 404, a frequency table 406, a frequency selection algorithm 408, and the like.

The positions 402 may be positions of the nodes in the system 100. The positions 402 may be in the form of coordinates (e.g., latitude/longitude coordinates). The positions 402 may include transmitter node positions 402a (i.e., position of the transmitter node 102), interferer node positions 402b (i.e., position of the interferer node 106), and/or receiver node positions 402c (i.e., position of the receiver node 104). The transmitter node positions 402a may be determined from a GNSS data. The interferer node positions 402b may be determined a priori. The receiver node positions 402c may be determined from the automatic link establishment 310, although this is not intended to be limiting.

Distances between nodes may be computed based on the locations. The distances may be on the order of several hundred kilometers up to thousands of kilometers, although this is not intended to be limiting.

The memory 212 may include a list of EIRPs 404 of the nodes in the system 100. The EIRPs 404 may include transmitter node EIRPs 404a and/or interferer node EIRPs 404b. The transmitter node EIRPs 404a may be much lower than the interferer node EIRPs 404b, where the interferer nodes 106 are fixed-site interferers.

The memory 212 may include a frequency table 406. The frequency table 406 may include a list of frequencies 410. The frequencies 410 may be frequencies in the HF band which the receiver nodes 102 and the transmitter nodes 104 use to establish the communication link 108.

The memory 212 may include a frequency selection algorithm 408. The frequency selection algorithm 408 may be further understood with reference to the method 600.

Figure 5:
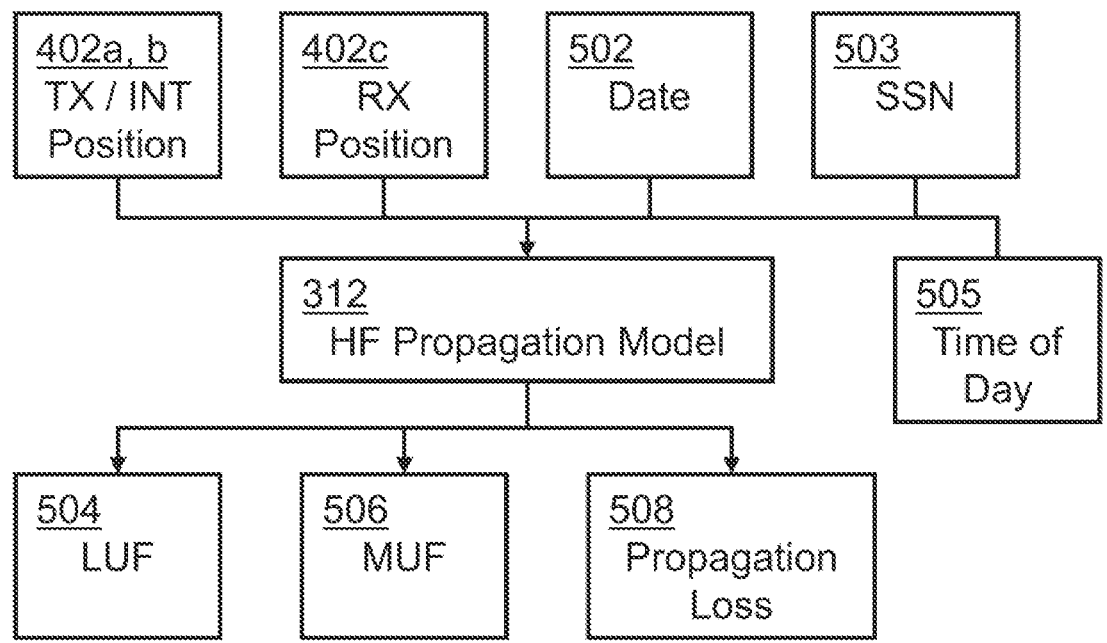
FIG. 5 depicts input and outputs of a high frequency (HF) propagation model, in accordance with one or more embodiments of the present disclosure.

Referring now to FIG. 5, the HF propagation model 312 is described, in accordance with one or more embodiments of the present disclosure. The HF propagation model 312 may include one or more inputs, such as, but not limited to, transmitter node position 402a, interferer node position 402b, receiver node position 402c, the date 502, the smoothed sun spot number 503, time of day 505, and the like.

The HF propagation model 312 may determine one or more parameters based on the date 502, such as, but not limited to, a sun spot number (SSN), and the like. The HF propagation model 312 may determine one or more parameters based on the transmitter node position 402a and/or the interferer node position 402b together with the receiver node position 402c, such as, but not limited to, a minimum angle in degrees, a distance between the nodes (e.g., distance in nautical miles or kilometers), and the like.

The HF propagation model 312 may include one or more outputs. The outputs may be determined based on the inputs (e.g., transmitter node position 402a, interferer node position 402b, receiver node position 402c, date 502), the SSN, and the like. The outputs may include a lowest useable frequency 504 (LUF), a maximum useable frequency 506 (MUF), and a propagation loss 508.

The LUF 504, the MUF 506, and the propagation loss 508 may be determined between each of the transmitter nodes and the receiver nodes. The LUF 504, the MUF 506, and the propagation loss 508 may also be determined between each of the interferer nodes and the receiver nodes. In this regard, the LUF 504, the MUF 506, and the propagation loss 508 may be dependent upon the receiver node position 402c and one of the transmitter node position 402a or interferer node position 402b depending upon whether the transmitter node 102 or the interferer node 106 is being analyzed. In embodiments, the LUF 504, the MUF 506, and the propagation loss 508 may be dependent upon distance between nodes, time of day, the sunspot number, and the like.

In embodiments, the HF propagation model 312 may output the LUF 504. The LUF 504 may refer to a lowest frequency at which the transmission is a lowest frequency in HF having a circuit reliability of 90 percent. Signals transmitted at frequencies below the LUF may experience high propagation loss.

In embodiments, the HF propagation model 312 may output the MUF 506. Frequencies above the MUF 506 may propagate. However, the probability of propagation for frequencies above the MUF 506 is 50% or less (i.e., the frequency may propagate less than 50% of the days in that month). The frequencies above the MUF 506 may pass through the ionosphere into space the remaining days of the month.

In embodiments, the HF propagation model 312 may output the propagation loss 508. The propagation loss 508 may be determined for each of the frequencies 410 in the frequency table 406. The propagation loss 508 may also be referred to as a total path loss or path attenuation. For example, the path the communication link 108 follows from the transmitter nodes 102 to the receiver nodes 104 may experience a first propagation loss. By way of another example, the path the interfering signal 110 follows from the interferer nodes 102 to the receiver nodes 104 may experience a second propagation loss.

In some embodiments, the HF propagation model 312 may determine the LUF 504, the MUF 506, and the propagation loss 508 if the position (+/−50 miles) of the nodes are known.

Figure 6A:
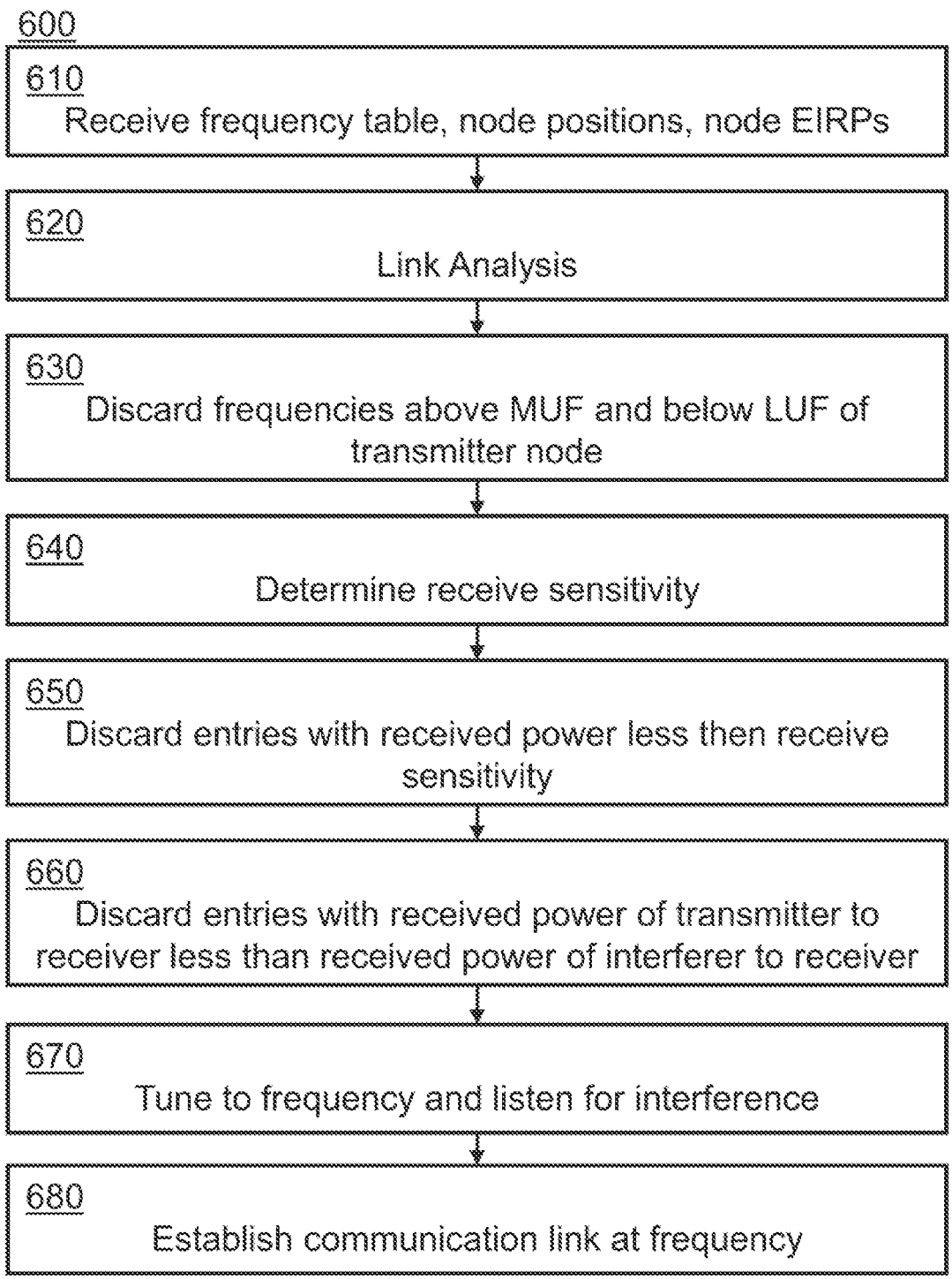
Figure 7F:
FIG. 7F depicts determining receive sensitivities for frequencies between the LUF and the MUF, in accordance with one or more embodiments of the present disclosure.

Referring now to FIG. 6, a flow diagram of method 600 is described, in accordance with one or more embodiments of the present disclosure. The embodiments and the enabling technology described previously herein in the context of the system 100, the node 200, and the waveform protocol stack 300 should be interpreted to extend to the method. For example, the method 600 may be implemented by the system 100, the node 200, and the waveform protocol stack 300. It is further recognized, however, that the method 600 is not limited to the system 100, the node 200, and the waveform protocol stack 300.

The method 600 may also be referred to as the frequency selection algorithm 408. The method 600 may be used to counter interferers through frequency selection and may ensure beyond line-of-sight (BLOS) communication given a priori knowledge of the location and EIRP of the interferers.

The method 600 may be further understood with reference to the exemplary tables provided in FIGS. 7A-7H. As an example, the system 100 may include one of the transmitter nodes 102, one of the receiver nodes 104, and a number M of the interferer nodes 106. The frequency table 406 may include N frequencies 410 in the HF band. For each hour of communication, there are then N+N*M computations. If there is one transmitter node, one receiver node, N frequencies, and M Interferer nodes then there are N possible signals related to communications between the transmitter node and receiver node and N×M entries related to signals from the interferer nodes and the receiver node. Thus, the method 600 may process N+(N*M) potential options for a given hour when the transmitter node is selecting a frequency to communicate with the receiver node.

In a step 610, frequency table 406, node positions 402, and node EIRPs 404 are received. The frequency table 406, node positions 402, and node EIRPs 404 may be received from memory 212.

In a step 620, a link analysis is performed. The link analysis may include performing a link analysis on each of communication links 108 between the transmitter nodes 102 and the receiver nodes 104 and also a link analysis on each of the interfering signals 110 from the interferer nodes 106 to the receiver nodes 104. The link analysis may be further understood with reference to FIG. 6B.

The link analysis may include a step 622 of determining LUF 504 and MUF 506. The LUF 504 and MUF 506 may be determined by computing a propagation analysis using the HF propagation model 312. The LUF 504 may include a LUF from the transmitter node 102 to the receiver node 104 and/or a LUF from the interferer nodes 106 to the receiver node 104. The LUF from the transmitter node 102 to the receiver node 104 may also be referred to as a TX to RX LUF or a F-LUF. The LUF from the interferer nodes 106 to the receiver node 104 may also be referred to as Interferer (1 through M) to RX LUF or a I (1 through M)-LUF, where M is the number of the interferer nodes 106. The MUF 506 may include a MUF from the transmitter node 102 to the receiver node 104 and/or a MUF from the interferer nodes 106 to the receiver node 104. The MUF from the transmitter node 102 to the receiver node 104 may also be referred to as a TX to RX MUF or a F-MUF. The MUF from the interferer nodes 106 to the receiver node 104 may also be referred to as a Interferer (1 through M) to RX MUF or a I (1 through M)-MUF, where M is the number of the interferer nodes 106. In this regard, each of the transmitter nodes 102 and/or interferer nodes 106 may include LUF 504 and MUF 506 to the receiver node 104.

The link analysis may include a step 624 of determining propagation losses 508 for each of the frequencies 410 in the frequency table 408. The propagation losses 508 for each of the frequencies 410 may be determined by computing a propagation analysis using the HF propagation model 312. The propagation losses 508 may include transmitter propagation losses from the transmitter nodes 102 to the receiver nodes 104. The propagation losses 508 may include interferer propagation losses from the interferer nodes 106 to the receiver nodes 104.

The link analysis may include a step 626 of determining a plurality of received powers 702 (e.g., Rcv'd power) at the receiver node 106 for each of the frequencies 410. The received powers 702 may also be referred to as a receiver signal level or a signal level that lands at the receiver node at the selected frequency. The received powers 702 may be computed for signals from the transmitter nodes 102 to the receiver nodes 104 (e.g., for the communication link 108). The received powers 702 may be computed for signals from the interferer nodes 106 to the receiver nodes 104 (e.g., for the interfering signal 110). The received powers 702 may be determined by computing a link budget. For example, the link budget may include a transmit power of a node (e.g., EIRP 404) minus propagation losses 508 between the node (e.g., transmitter nodes 102, interferer nodes 106) and the receiver node 104. In other words, the received signal (in dBm) is determined by subtracting the propagation loss (in dB) from the EIRP (in dBm). The received powers 702 and/or link budgets may be computed for a range of frequencies in the frequency table 406 at a given time of day. The received powers 702 may then indicate signals that the transmitter node 102 and/or the interferer node 106 may land at the receiver node 104.

The received powers 702 may be determined for every transmitter node 102, receiver node 104, and interferer node 106 of the system 100. The received power 702 may also be determined for every frequency 410 in the frequency table 406. The received power 702 may also be determined for hours during the day. In this regard, a large number of received powers 702 may be determined.

In a step 630, the frequencies above the MUF of the transmitter node (e.g., TX to RX MUF or F-MUF) are discarded. The frequencies 410 below the LUF of the transmitter node (e.g., TX to RX LUF or F-LUF) may also be discarded. In this regard, the transmitter node 102 will not select frequencies above the F-MUF or below the F-LUF because the frequencies may or may not propagate. Discarding the frequencies above the F-MUF and below the F-LUF may be beneficial to reduce the total number of available frequencies required for processing. The frequencies above the F-MUF and below the F-LUF may be discarded to determine a subset 704 of the frequencies 410 and/or received powers 702. The transmitter node will then not use a frequency above the F-MUF or below the F-LUF after discarding frequencies above the F-MUF and below the F-LUF. Similarly, the interferer node 106 will not select frequencies above the I-MUF or below the I-LUF. For example, FIG. 7E depicts the frequency F(N-1) as being above the MUF from a second interferer node INT(2) to the receiver node 104 (i.e., F(N-1) above INT(2) to RX MUF). The second interferer node INT(2) will not select the frequency F(N-1) for the interfering signal 110. In this example, the entry is discarded from the subset 704.

There are two cases to consider. In a first case, the F-MUF is below the I-MUF. The interferer node 106 may know that the F-MUF and the I-MUF. The interferer node 106 will not select the frequencies between the F-MUF and the I-MUF for the interfering signal 110. In a second case, the F-MUF is above the I-MUF. The interferer node 106 is at a disadvantage in this example because the transmitter node 102 may select frequencies between the F-MUF and the I-MUF which propagate for the transmitter node 102 but which may or may not propagate for the interferer node 106. For example, the second interfering node INT(2) is at a disadvantage for the frequency F(N-1).

In a step 640, a plurality of receive sensitivities 706 of the receiver node are determined. Receive sensitivity may refer to the lowest signal that the receiver node 104 can hear. The receiver node 104 is unable to hear signals below the receive sensitivity. The receive sensitivity may be based on an architecture of the receiver node, robustness of the waveform employed, and frequency of operation, and is not intended to be limiting. The receive sensitivities 706 of the receiver node may be determined for each frequency between the LUF and the MUF of the transmitter node. For example, the receive sensitivities 706 of the receiver node may be determined for the subset 704. In this regard, the receive sensitivities 706 are not determined for the frequencies below the F-LUF or above the F-MUF.

In a step 650, the received powers 702 at the receiver node which are less than the receive sensitivities 706 are discarded to determine a subset 708. The received powers 702 being less than the receive sensitivities 706 indicates the receiver node 104 is unable to receive the signal (e.g., the communication link 108 and/or the interfering signal 110 is below the receive sensitivity). If the signal 108 received by the receiver node 104 from the transmitter node 102 is below the receive sensitivity 706 then the receiver node 104 cannot decode the message, so that the associated frequency cannot be used. There is no point using frequencies with receiver signal levels below the receiver sensitivity because even if the transmitter node may transmit a signal to the receiver node which is higher than the interferer node on that frequency, the receiver node is unable to hear the signal due to limitations with the receiver sensitivity. The subset 708 of available frequencies in the frequency table 406 has now been reduced based on the LUF between the transmitter node and the receiver node, the MUF between the transmitter node and the receiver node, and the receive sensitivity. All frequencies where the signal 108 received by the receiver node 104 from the transmitter node 102 is above the receive sensitivity 706 may be used by the transmitter node 102 to talk to the receiver node 104 and remain in the subset 708.

Similarly, the received powers 702 at the receiver node from the interferer node 106 which are less than the receive sensitivities 706 are discarded. If the signal 110 received by the receiver node 104 from the interferer node 106 is below the receive sensitivity 706 then the receiver node 104 cannot hear the interfering signal, so that the associated interferer node entries associated with the frequency may be removed. The subset 708 now includes entries where the transmitter node 106 can land a signal that is above the receive sensitivity 706 and where the interferer node 106 can land a signal that is above the receive sensitivity 706.

In embodiments, the entries may be separated into desired signal entries and interferer entries subsequent to the step 650. The desired signal entries and the corresponding interferer entries may then be ordered based on frequency (low to high or high to low).

In a step 660, the received power 702 of the signal from the transmitter node 102 to the receiver node 104 (e.g., TX to RX communication link 108) is compared with each of the received powers 702 of the signals from the interferer nodes to the receiver node (e.g., Interferer to RX interfering signal 110) for every frequency in the subset 708. If any of the interferer entries are above the signal entry at a given frequency then the given frequency cannot be used. The interferer node may interfere with or deny the transmit signal if the signal level from the transmitter node to the receiver node is less than the signal level from the interferer node to the receive node.

If the received power 702 of the signal from the transmitter node 102 to the receiver node 104 is greater than all of the received powers of the signals from the interferer nodes to the receiver node at a given frequency, then the given frequency may be added to a short-listed frequency table or a subset 710. The subset 710 may be a subset of the subset 704 and/or the subset 708. The transmit signal may be received without being interfered with or denied if the signal level from the transmitter node to the receiver node is greater than the signal level from the interferer node to the receive node. If the received power 702 of the signal from the transmitter node 102 to the receiver node 104 is less than any of the received powers of the signals from the interferer nodes to the receiver node at a given frequency, then the given frequency is discarded from the subset 710.

The received power of the signal from the transmitter node 102 to the receiver node 104 may be compared with all of the received powers of the signals from the interferer nodes to the receiver node by computing a link margin for every frequency. The link margin may refer to a difference between the desired signal and the interfering signal and for every interfering node. The link margin may be measured in dB. Higher link margins may indicate the given frequency has a higher probability of surviving interfering. The subset 710 may also include link margins over the strongest interferer. The strongest interferer may refer to interferer node with the highest received power at the receiver node.

Thus, the subset 710 includes frequencies which are between the MUF and LUF of the transmitter, are able to be received by the receiver, and have a link margin over the strongest interferer. In this regard, the subset 710 may be determined by discarding any of the subset 704 in which the received powers from the transmitter node to the receiver node are below the receive sensitivities 706 and in which the received powers from the transmitter node to the receiver node are below the received powers from the interferer nodes to the receiver node.

In embodiments, the subset 710 may be sorted based on the link margin. For example, the subset 710 may be sorted such that frequencies with the highest link margin are at the top of the subset 710.

In a step 670, the software-defined radio 204 is tuned to a frequency and listen for interference on that frequency. The software-defined radio 204 may be tuned to any of the frequencies in the subset 710. In embodiments, the software-defined radio 204 is tuned to the frequency with the highest link margin over the interfering nodes. If the interference is greater than a threshold, the software-defined radio may tune to the frequency with the next highest link margin in the subset 710 and listen for interference at that frequency.

In a step 680, the software-defined radio 204 uses the frequency with interference below the threshold to establish the communication link 108 with the receiver node 106.

Referring now to FIG. 8, a flow diagram of a method 800 is described, in accordance with one or more embodiments of the present disclosure. The method 800 may describe an optional step which is performed on the subset 710 between the step 660 and the step 670 of the method 600.

In embodiments, the subset 710 or short-listed frequency table may be split into a primary list and a secondary list based on the MUF between the interferer nodes 106 and the receiver node 104 (e.g., I-MUF). The frequencies in the subset 710 may be compared with the MUFs 506 (e.g., Interferer to RX or I-MUF). Frequencies in the subset 710 below the I-MUF may be added to the primary list. Frequencies in the subset 710 above the I-MUF may be added to the secondary list.

The interferer node 106 is unable to guarantee that the interfering signal 110 will propagate from the interferer node 106 to the receiver node 104 at frequencies above the I-MUF. In this regard, the interferer node may not pick frequencies to transmit the interfering signal 110 that are above the I-MUF to prevent wasting interfering resources.

In a step 820, the primary list and the secondary list may be sorted based on link margin. For example, the primary list and the secondary list may be sorted such that the highest link margins are first in the table.

In a step 832, the short-list or subset 710 may be recreated by appending the secondary list to the primary list. Notably, the short-list or subset 710 is now in a different order due to appending the secondary list to the primary list. Appending may refer to adding the frequencies from the secondary list after the frequency in the primary list. The method 800 may then proceed to step 670 using the subset 710 with the secondary list appended to the primary list. In this case, the transmitter node 102 is unsure of the behavior of the interferer node 106. For example, the transmitter node 102 is unsure if the interferer node 106 will transmit above the I-MUF.

In another instantiation or a step 834, the short-list or subset 710 may be recreated by appending the primary list to the secondary list. The method 800 may then proceed to step 670 using the subset 710 with the primary list appended to the secondary list. In this case, the transmitter node 102 is sure of the behavior of the interferer node 106. For example, the transmitter node 102 is sure that the interferer node 106 will not transmit the interfering signal 110 at frequencies above the I-MUF of the interferer node 106. The transmitter node 102 may then select frequencies above the I-MUF with the highest link margin (e.g., the secondary list). The primary frequencies are appended to the secondary frequencies to provide a backup in case none of the secondary frequencies are available.

Figure 9:
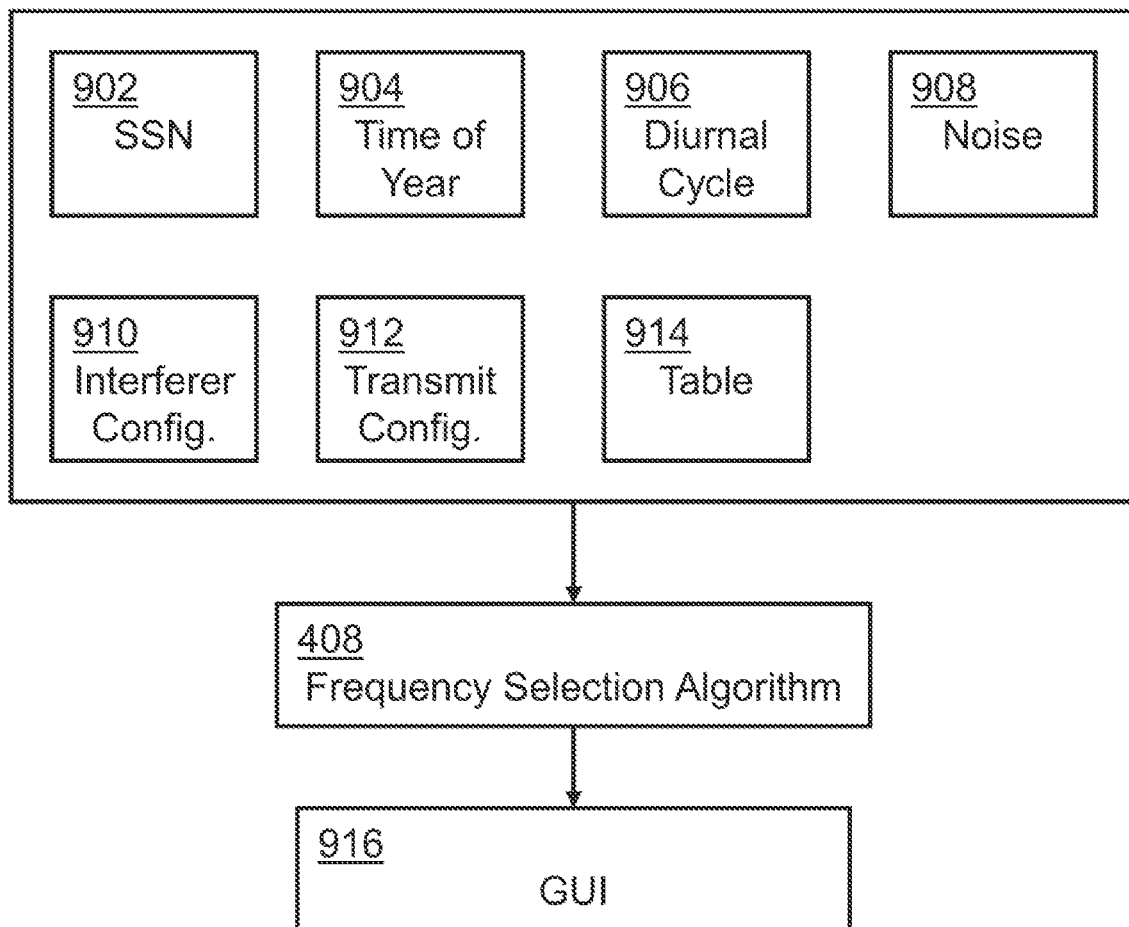
FIG. 9 depicts a simplified block diagram of an HF mission planner, in accordance with one or more embodiments of the present disclosure.

Referring now to FIG. 9, an HF Mission Planner 900 is described, in accordance with one or more embodiments of the present disclosure. The HF Mission Planner 900 may include the frequency selection algorithm 408. The embodiments and enabling technologies described previously herein may also be implemented by the HF Mission Planner 900.

The HF Mission Planner 900 may simulate a mission with different sets of parameters. The parameters may include, but are not limited to, Sun Spot Cycle Period 902 (e.g., a SSN ranging between 0 and 200 or more), a time of the year 904 (e.g., Month, Summer, Winter, Fall, Spring), diurnal cycle 906 (e.g., Dusk, Dawn, Day, Night, and/or time of day), background noise 908 (e.g., location, frequency), interferer configurations 910 (e.g., interferer position, interferer EIRP), transmitter configurations 912 (transmitter node placement, transmitter node EIRP), frequency table 914, and the like.

In embodiments, the HF Mission Planner 900 may determine the short-listed frequency table or the subset 710 for several hours of communication. In this regard, the subset 710 may include frequencies which are expected to be successfully received over the interfering signal 110. The frequencies may change between hours throughout the diurnal cycle. The subset 710 with several hours of the frequencies may be referred to as an hourly frequency table, although this is not intended to be limiting.

The HF Mission Planner 900 may output a graphical user interface 916 based on the inputs. The graphical user interface 916 may indicate whether the transmitter nodes are able to establish communication in the presence of the interferer nodes. The graphical user interface 916 may indicate whether communication may work during a mission. The mission may then be implemented using the frequency table 914 with confidence that the BLOS communications will survive interfering from the interferer nodes. The graphical user interface 916 may also provide different transmitter and/or interferer configurations.

The HF mission planner 900 may be used for offensive mission planning. In offensive mission planning, attacking transmitter and attacking receiver node placements may be tested against defensive interferer placements. The HF mission planner 900 may select frequencies and node assets with required EIRP to see if communication may occur in the presence of interfering. The HF mission planner 900 may determine the optimal placement of the transmitter node and receiver node to ensure communication in the presence of interferer nodes. For example, the HF mission planner 900 may determine the placement by iteratively changing the positions of the transmitter node and receiver node until one or more of the frequencies is received above the interfering signal 110.

The HF mission planner 900 may be used for defensive mission planning. In defensive mission planning, interferer node placements may be tested against interferer transmitter node and interferer receiver node deployments. The HF mission planner 900 may determine if the interferers are successful in interfering with other communication. The HF mission planner 900 may determine the optimal placement of the interferer nodes for denying the communication link 108 (e.g., deny HF BLOS communication) between the transmitter node and the receiver node positioned in a given airspace.

Referring generally again to FIGS. 1-9.

The waveform protocol stack 300 may include date, time, Sun Spot Number (SSN), transmitter configuration, receiver configuration, and/or interferer configuration. The transmitter configuration may include (position (e.g., latitude, longitude), EIRP, beamwidth, axial direction, and the like). The receiver configuration may include a position (e.g., latitude, longitude), receiver sensitivity, and the like. The interferer configuration may include information about known interferers (position (e.g., latitude, longitude), EIRP, beamwidth, axial direction, and the like). The waveform may also receive interferer configuration updates. The interferer configuration updates may be received over the air (in-band and/or out-of-band).

The method 600 may or may not include discarding interferer signals which are above the MUF of the interferer or below the LUF of the interferer. In this regard, frequencies which are above the MUF of the interferer or below the LUF of the interferer may still propagate from the interferer node to the receiver node but with higher path loss and/or with a likelihood of being lost to space. In embodiments, the higher path loss may be accounted for in a link budget.

In some instances, the subset 710 may be empty indicating that there is no frequency usable to survive the interfering configuration at the given date and time.

Because networks configured in accordance with embodiments of the inventive concepts disclosed herein use a TDMA based waveform, an interruption mechanism can be implemented to interrupt a transmission in progress at time slot boundaries. Since a TDMA transmission is bounded within the time slot boundary, a node can interrupt another node at slot boundaries even if the next slot is not assigned to the interrupting node.

The methods, operations, and/or functionality disclosed may be implemented as sets of instructions or software readable by a device. The steps may include computations which may be performed simultaneously, in parallel, or sequentially. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure. For example, the program instructions may include a frequency selection algorithm, an HF mission planner, and the like.

Referring generally to FIGS. 10-14A. As described previously herein, the combination of the waveform protocol stack 300 and frequency selection algorithms may enable HF beyond line-of-sight communication in the presence of one or more interferers. If direct communication is possible then the frequency with the highest link margin over the jammers is selected from the short-listed table. However, the transmitter nodes 102 and/or the receiver nodes 104 may operate closer to the interferer nodes 106, such that there is insufficient link margin to enable direct HF beyond line-of-sight communication between the nodes. If direct communication is not possible then a relay node is used to establish end-to-end communication. The relay node delivers a signal at the receiver node with sufficient link margin. The relay node and a frequency are selected whose propagation characteristics enable relaying the HF beyond line-of-sight communication between the transmitter nodes 102 and the receiver nodes 104. A joint relay and frequency selection algorithm is also described selecting the relay node and the frequency. Thus, embodiments of the present disclosure are directed to 1) selecting the relay node and frequency, and 2) planning the location of the relay node.

Figure 10:
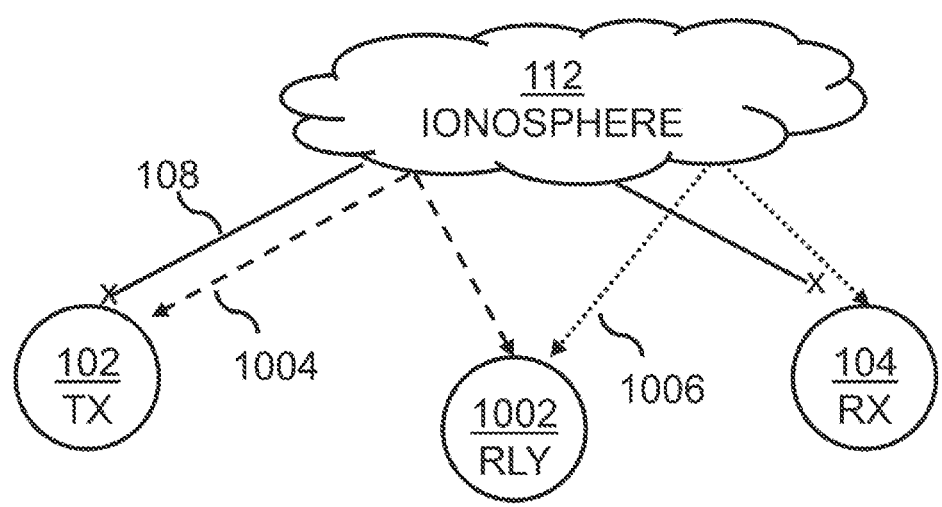
FIG. 10 depicts a system including a transmitter node, a relay node, and a receiver node, in accordance with one or more embodiments of the present disclosure.

Referring now to FIG. 10, a system 1000 is described, in accordance with one or more embodiments of the present disclosure. The system 1000 may also be referred to as a communication network, a high frequency (HF) communication network, and/or a beyond line-of-sight (BLOS) communication network. The system 1000 may include one or more nodes, such as, but not limited to, transmitter nodes 102, receiver nodes 104, interferer nodes 106, and relay nodes 1002 (RLY). The interferer nodes 106 are not depicted in the interest of clarity. Similarly, although one of the relay nodes 1002 is depicted, this is not intended as a limitation of the present disclosure. It is contemplated that the system 1000 may include a plurality of the relay nodes 1002.

The communication link 108 between the transmitter node 102 and the receiver node 104 is denied. Direct HF beyond line-of-sight communication between the transmitter node 102 and the receiver node 104 is not available. The interfering signals 110 from the interferer nodes 106 interfere with and prevent the direct communication. For example, the communication link 108 may include a negative link margin or a link deficit over the interfering signals 110. In this regard, the received power 702 by the receiver node 104 from the transmitter node 102 is below the received power 702 of the signals from the interferer nodes 106 to the receiver node 104.

The system 1000 includes one or more of the relay nodes 1002. The discussion of the transmitter nodes 102 and the receiver nodes 104 is herein incorporated by reference as to the relay nodes 1002. In this regard, the relay nodes 1002 may include one or more antennas 202 and software-defined radio 204, may be configured to host the waveform protocol stack 300, and/or may include the memory 212 with positions 402, EIRPs 404, frequency table 406, frequency selection algorithm 408.

The transmitter nodes 102 and the relay nodes 1002 establish a communication link 1004. The communication link 1004 enables communication between the transmitter nodes 102 and the relay nodes 1002. For example, the transmitter nodes 102 may transmit a waveform to the relay nodes 1002 to establish the communication link 1004. The communication link 1004 may be a connection between the nodes enabling transfer of data over the waveform in space.

The relay nodes 1002 and the receiver node 104 also establish a communication link 1006. The communication link 1006 enables communication between the relay nodes 1002 and the receiver nodes 104. For example, the relay nodes 1002 may transmit a waveform to the receiver nodes 104 to establish the communication link 1006. The communication link 1006 may be a connection between the nodes enabling transfer of data over the waveform in space.

The communication link 1004 and the communication link 1006 may enable relayed or end-to-end communication between the transmitter node 102 and the receiver node 104. In particular, the communication is enabled over the interfering signals 110 from the interferer nodes 106. The communication link 1004 and the communication link 1006 each refer to a beyond line-of-sight communication link in the HF band. The links are transmitted from the respective nodes, reflected from the ionosphere 112, and received by the respective nodes. The communication links reflect from the ionosphere 112 in one or more hops between the nodes. For example, the communication links may reflect from any of the layers of the ionosphere 112 in one hop or multiple hops before being received.

Although the system 1000 depicts a relayed communication through one of the relay nodes 1002, this is not intended as a limitation of the present disclosure. It is further contemplated that the system 1000 may include additional of the relay nodes 1002, where the communication is relayed through the additional relay nodes.

The relay node 1002 may be considered a transmitter node and a receiver node. In this regard, the relay node 1002 may receive the signal from the transmitter node 102. The relay node 1002 may then transmit the signal to the receiver node 104. The relay node 1002 may achieve a signal power at the receiver node 104 which is higher than what the transmitter node 102 is able to achieve. In this regard, the relay node 104 may include a link margin over the interfering signal 110 from the interfering nodes 106.

Embodiments of the present disclosure are directed to selecting the relay node 1002, selecting a frequency for the communication link 1004, and selecting a frequency for the communication link 1006. The frequencies are selected with the highest link margin over the interfering signals from the interfering nodes 106. A method 1100 is described to select the relay node 1002 and the frequencies which enables the relay HF beyond line-of-sight communication.

Embodiments of the present disclosure are also directed to placing the relay node 1002 in a position to ensure the communication link 1004 and the communication link 1006 are above the interfering signals. Placing the relay node 1002 too close to the transmitter node 102 may cause the relay signal to be interfered with by the interfering signal at the receiver node 1002. Similarly, placing the relay node 1002 too close to the receiver node 104 may cause the transmitter signal to be interfered with by the interfering signal at the relay node 1002. A method 1300 is described to find a position for the relay node 1002 between the transmitter node 102 and the receiver node 104 which enables the relay HF beyond line-of-sight communication.

Various communication links are described in the present application. The communication links may to unidirectional communication links and/or bidirectional communication links. For example, the transmitter node 102 may communicate to the receiver node 104 but the relay node 104 may not return the communication over the unidirectional link. By way of another example, the transmitter node 102 and relay node 104 may each communicate over the bidirectional link. Furthermore, the communication links may refer to symmetrical communication links and/or asymmetrical communication link. Symmetrical communication links refer to links which are routed through the same nodes. Asymmetrical communication links refer to links which are routed through separate nodes.

Referring now to FIG. 11, a flow diagram of a method 1100 is described, in accordance with one or more embodiments of the present disclosure. The method 1100 may describe a method of selecting relay nodes and frequencies. The embodiments and the enabling technology described previously herein in the context of the system 1000 should be interpreted to extend to the method. For example, the method 1100 may be implemented by a software defined radio of any of the nodes of the system 1000. It is further recognized, however, that the method 1100 is not limited to the system 1000.

In a step 1110, direct communication between the transmitter node 102 and the receiver node 104 is determined to be unavailable. The direct communication may be determined to be unavailable by performing one or more steps of the method 600. For example, the step 660 the received power of the transmitter to the receiver may be less than the received power of the interferer to the receiver. In this regard, the short-listed frequency table or a subset 710 may include no frequencies which include a positive link margin over the interfering signal. Thus, the direct communication is unavailable.

In a step 1120, a direct communication analysis is performed for the communication link 1006 between the relay node 1002 and the receiver node 104. The step 1120 finds a subset of the relay nodes 1002 that can land a signal at the receiver node 104 above the interfering signal 110. The direct communication analysis may determine a potential relay table 1202. The potential relay table 1202 includes a subset of the frequencies in the frequency table 406. The subset of the frequencies in the frequency table may be frequencies which are between the LUF and the MUF between the relay node 1002 and the receiver node 104. The subset of the frequencies in the frequency table may also include a received power at the receiver node above the receive sensitivity of the receiver node 104. The subset of the frequencies in the frequency table may also include a positive link margin over the interfering nodes 106. For example, the received power 702 of the signal from the relay node 1002 to the receiver node 104 (e.g., RLY to RX communication link 1006) is compared with each of the received powers 702 of the signals from the interferer nodes to the receiver node (e.g., Interferer to RX interfering signal 110) for every frequency to determine the link margins or deficits. The method 1100 may also determine the link margin associated with each of the frequencies for the communication link 1006.

The system 1000 may include a plurality of the relay nodes 1002. In some embodiments, the step 1120 may be performed for each of the plurality of relay nodes 1002. For example, the memory 212 may include a list of the relay nodes. The step 1120 may be iteratively performed for each relay node in the list of the relay nodes to generate the potential relay table 1002.

Referring now to FIG. 12A, an example of the potential relay table 1202 is described, in accordance with one or more embodiments of the present disclosure. The potential relay table 1202 may include the frequencies and associated link margins for each of the communication links 1006 between the plurality of relay nodes 1002 and the receiver node 104. In this example, there are M of the relay nodes 1002 in the system 1000 and N of the frequencies in the frequency table 406. The following frequencies are identified as potential relays: relay RLY(1) at frequency F(N−1); relay RLY(2) at frequency F(2) and at frequency F(N−1); relay RLY(M−1) at frequency F(2); and relay RLY(M) at frequency F(N−1). This example is merely illustrative and is not intended to be limiting.

Referring again to FIG. 11, the step 1120 of performing the direct communication analysis for the communication link 1006 between the relay node 1002 and the receiver node 104 may include one or more steps of the method 600. The method 600 is incorporated herein by reference in the entirety with all instances of transmitter replaced with relay. In this regard, the relay node 1002 may be considered the transmitter node 102 when evaluating the direct HF communication link 1006 between the relay node 1002 and the receiver node 104. The step 1120 may include one or more steps from the method 600. The step 1120 may include the step 610 of receiving frequency table 406, node positions 402, and node EIRPs 404 of the relay nodes 1002 and the receiver nodes 104. The step 1120 may include the step 620 of performing link analysis on the communication link 1006. Similarly, discussion of the steps 622-626 in the step 620 of performing link analysis may include on the communication link 1006 may be modified with all instances of transmitter replaced with relay. The step 1120 may include the step 630 of discarding frequencies above the MUF and/or below the LUF of the relay node. The step 1120 may include the step 640 of determining receive sensitivities of the receiver node. The step 1120 may include the step 650 of discarding received powers from the relay node at the receiver node which are less than the receive sensitivities. The step 1120 may include the step 660 of discarding entries with received powers of the relay nodes to the receiver nodes less than the received power of the interferer nodes to the receiver nodes to generate the potential relay table 1202. In some embodiments, the step 1120 may or may not include the steps 670 and/or step 680. The steps 670 and/or step 680 are not immediately performed by the relay nodes 1002 in the step 1120. Rather, the relay nodes 1002 performs the step 670 of tuning to the frequency and listening for interference and the step 680 of establishing the communication link 1006 at the frequency in a subsequent step of the method 1100.

In a step 1130, a direct communication analysis is performed between the transmitter node 102 and the relay node 1002. The step 1130 determines a subset of the relay nodes 1002 with which the transmitter node 104 may communicate. The direct communication analysis may be performed for each of the plurality of relay nodes 1002 or for each of the relay nodes which include at least one entry in the potential relay table 1202. In some embodiments, the step 1130 may be performed for each of the plurality of relay nodes 1002. However, performing the direct communication analysis for each of the relay nodes 1002 may be computationally intensive. In some embodiments, the direct communication analysis is performed between the transmitter node 102 and the relay nodes 1002 for each of the relay nodes which include at least one entry in the potential relay table 1202. In this regard, the direct communication analysis may only be performed on relay nodes which are expected to achieve a communication link to the receiver node which is able to be received above the interfering signals. Performing on the subset may be advantageous to reduce the computational requirements of the direct communication analysis. The direct communication analysis may determine a potential route table 1204 based on the potential relay table 1202.

The potential route table 1204 may be determined by determining a subset of the frequencies in the potential relay table 1202. The subset of the frequencies may be frequencies which are between the LUF and the MUF between the transmitter node 102 and the relay node 1002. The subset of the frequencies in the frequency table may also include a received power at the relay node 1002 above the receive sensitivity of the relay node. The subset of the frequencies in the frequency table may also include a positive link margin over the interfering nodes 106. For example, the received power 702 of the signal from the transmitter node 102 to the relay node 1002 (e.g., TX to RLY communication link 1004) is compared with each of the received powers 702 of the signals from the interferer nodes to the relay node (e.g., INT to RLY interfering signal 110) for every frequency to determine the link margins or deficits.

Referring now to FIG. 12B, an example of the potential route table 1204 is described, in accordance with one or more embodiments of the present disclosure. The potential route table 1204 may include the frequencies and associated link margins for each of the communication links 1004 between the transmitter node 102 and the plurality of relay nodes 1002 and frequencies and associated link margins for each of the communication links 1006 between the plurality of relay nodes 1002 and the receiver node 104.

In this example, there are M of the relay nodes 1002 in the system 1000 and N of the frequencies in the frequency table 406. The following frequencies are identified as potential routes: transmitter TX to relay RLY(1) at frequency F(2) relaying to receiver (RX) at frequency F(N-1); transmitter TX to relay RLY(N-1) at frequency F(N-1) relaying to receiver (RX) at frequency F(2). This example is merely illustrative and is not intended to be limiting.

Referring again to FIG. 11, the step 1130 of performing the direct communication analysis for the communication link 1004 between the transmitter node 102 and the relay nodes 1002 may include one or more steps of the method 600. The method 600 is incorporated herein by reference in the entirety with all instances of receiver replaced with relay. In this regard, the relay node 1002 may be considered the receiver node 102 when evaluating the direct HF communication link 1004 between the transmitter node 102 and the relay node 1002. The step 1130 may include one or more steps from the method 600. The step 1130 may include the step 610 of receiving frequency table 406, node positions 402, and node EIRPs 404 of the transmitter nodes 102 and the relay nodes 1002. The step 1130 may include the step 620 of performing link analysis on the communication link 1004. Similarly, discussion of the steps 622-626 in the step 620 of performing link analysis may include on the communication link 1004 may be modified with all instances of receiver replaced with relay. The step 1130 may include the step 630 of discarding frequencies above the MUF and/or below the LUF of the transmitter node. The step 1130 may include the step 640 of determining receive sensitivities of the relay nodes. The step 1130 may include the step 650 of discarding received powers from the transmitter node at the relay nodes which are less than the receive sensitivities. The step 1130 may include the step 660 of discarding entries with received powers of the transmitter node to the relay nodes less than the received power of the interferer nodes to the relay nodes to generate the potential route table 1204. In some embodiments, the step 1130 may or may not include the steps 670 and/or step 680. The steps 670 and/or step 680 are not immediately performed by the relay nodes 1002 in the step 1120. Rather, the relay nodes 1002 performs the step 670 of tuning to the frequency and listening for interference and the step 680 of establishing the communication link 1006 at the frequency in a subsequent step of the method 1100.

In some embodiments, the various nodes may or may not include identical transmit powers. If all the nodes have identical transmit power, then knowing that the signal from the relay node 1002 to the receiver node 104 propagates above the interfering signal it is also true that the signal from the receiver node 104 to the relay node 1002 is known to propagate. However, the receiver node 104 may be less capable or have a lower transmit power than the transmitter node 102 and/or the relay nodes 1002. An asymmetrical communication link may then be required.

In a step 1140, the potential relay table 1204 is sorted based on composite link margin. The composite link margin may refer to the link margin of the communication link 1004 and the link margin of the communication link 1006. The highest composite link margin may be selected for relaying the communication between the transmitter node 102 and the receiver node 104 through the relay node 1002.

In some embodiments, the method 1100 may further include one or more additional steps of performing direct communication analysis on the communication link 1006 from the receiver node 104 to the relay node 1002. If the direct communication from the receiver node 104 to the relay node 1002 does not propagate then only unidirectional communication links are supported. The method 1100 may be utilized to form an asymmetric communication network, as will be described further herein. It is further contemplated that the communication link 1006 from the receiver node 104 to the relay node 1002 may be evaluated during a link establishment phase. If the relay node 1002 does not receive an acknowledgement message, then the relay node 1002 may know that only unidirectional communication links are supported.

In a step 1150, the communication link 1004 between the transmitter node 102 and the relay node 1002 and the communication link 1006 between the relay node 1002 and the receiver node 104 are established. The entries in the potential route table 1204 can all be used for establishing end-to-end communication. The communication links may be established using the highest composite link margin. For example, the relay node and frequencies with the highest composite link are selected. The transmitter node 102 send a control message to the relay node 1002. The control message establishes a session between the transmitter node 102 and the relay node 1002. The control message includes the frequencies for the communication link 1004 and the communication link 1006. The relay node 1002 checks if the frequencies are available. If the frequencies are available, the relay node 1002 establishes the communication link 1004. The relay node 1002 also sends a control message to the receiver node 104. The control message establishes a session between the relay node 1002 and the receiver node 104. The control message includes the frequencies for communication link 1006. The receiver node 104 checks if the frequencies are available. If the frequencies are available, the receiver node 104 establishes the communication link 1006.

As described previously herein, the communication links may or may not be symmetrical. In some embodiments, the method 1100 may determine and establish a first path (e.g., TX-to-RLY1-to-RX) for communication from the transmitter node 102 to the receiver node 104 and a second path (e.g., RX-to-RLY2-to-TX) for communication from the receiver node 104 to the transmitter node 102. The method 1100 may include determining the asymmetric communication links.

The steps for determining the asymmetric communication links are now described. The steps 1110-1140 are first performed to determine the link from the transmitter node 102 to the receiver node 104 through the various relays. The steps of the method 1100 are then repeated to evaluate the reverse direction of communication from the receiver node 104 to the transmitter node 102 through the various relays. In step 1110a, the direct communication between the receiver node 104 and the transmitter node 102 is determined to be unavailable. In step 1120a, direct communication analysis is performed for the communication link 1004 between the transmitter node 102 and the relay node 1002. In step 1130a, direction communication analysis is performed between the relay nodes 1002 and the transmitter node 102. The relay nodes 1002 may or may not be the same relay nodes used in the step 1130. For example, the step 1130a may perform the direct communication analysis for the relay nodes 1002 determined in the step 1120a which propagate to the transmitter node 102. In step 1140a, the potential relay table 1204 is sorted based on composite link margin for the links from the receiver node 104 to the transmitter node 102 through the relays.

The communication links over the first path and over the second path may then be established using the step 1150. Thus, asymmetric bidirectional communication is enabled between the transmitter node 102 and the receiver node 104 via separate relay paths.

In some embodiments, the potential route table 1204 may be empty. The method 1100 may be repeated using a two-relay configuration. The end-to-end communication path between the transmitter node 102 and the relay node 104 may then include two of the relay nodes 1002 (e.g., Tx-Relay2-Relay1-Rx). The method 1100 may be recursively implemented to determine the potential route table 1204 for any higher order number of the relays.

There is also a time component involved with the communication links. The propagation can be stable for one or more hours. The communication links may be recomputed when the propagation threshold is determined to be unstable because the MUF, LUF, and propagation characteristics of the nodes in the system 1000 have changed. The recompute time may be a configurable parameter. For example, the recompute time may be reconfigurable from 10 minutes to 24 hours or more. The recompute time may be configured on a per mission basis.

The method 1100 is described in the context of relay nodes 1002 which have a known position. This is not intended to be limiting. A method is further described herein which allows for planning the position of the relay nodes 1002 to ensure the communication links.

Figure 13:
FIG. 13 depicts a flow diagram of a method of placing nodes to relay HF communication, in accordance with one or more embodiments of the present disclosure.
Figure 13:
Figure 13:
Figure 13:

Referring now to FIG. 13, a flow diagram of a method 1300 is described, in accordance with one or more embodiments of the present disclosure. The method 1300 may describe a method of placing the relay nodes and selecting frequencies for the relay communication links such that there is at least one path between the transmitter node 102 and the receiver node 104 that overcomes the interference. The method 1300 may also be referred to as a relay placement algorithm. The embodiments and the enabling technology described previously herein in the context of the system 1000 should be interpreted to extend to the method. For example, the method 1300 may be implemented by a software defined radio of any of the nodes of the system 1000. It is further recognized, however, that the method 1300 is not limited to the system 1000.

In a step 1310, a link margin deficit between the transmitter node 102 and the receiver node 104 is determined. The link margin deficit is the highest link margin deficit of a plurality of link margins of the communication link 108 between the transmitter node 102 and the receiver node 104. The link margin deficit is the difference between the transmitted signal power and interfering signal power at the receiver. The link margin deficit may be determined by performing one or more steps of the method 600. For example, a propagation analysis is performed between the transmitter node 102 and the receiver node 104. All frequencies in the frequency table that are below the F-LUF and above the F-MUF are discarded. The remaining frequencies are a list of propagating frequencies. The propagating frequencies propagate well between the transmitter node 102 and the receiver node 104. For each propagating frequency, the link budget and the received signal power are computed for the transmitted signals at the receiver node 104. For each propagating frequency, a propagation analysis is performed between the interferer nodes 106 and the receiver nodes 104. All frequencies that are below the I-LUF and above the I-MUF are discarded. The link budget and the received signal powers are computed for the interfering signals and at the receiver node 104. The highest link margin deficit is then computed from the received signal powers of the transmitted signal and the received signal powers from the interfering signals.

In a step 1320, a reduction in range is determined to overcome the link margin deficit. The reduction in range may be determined by determining the path or propagation loss at distances between the transmitter node 102 and the receiver node 104 at one or more frequencies. The maximum propagation loss may be at the receiver node 104. The propagation loss may generally decrease from the receiver node 104 towards the transmitter node 102. The link margin deficit is subtracted from the maximum propagation loss to determine a desired propagation loss. The desired propagation loss indicates a highest of the propagation losses at which the transmitted signals may be received with a positive link margin over the interfering signals. A distance corresponding to the desired propagation loss may be determined. The distance may refer to the reduction in range. The method 1300 may space the relay node 1002 as far as possible away from the transmitter node 102 while achieving the positive link margin. Spacing the relay node 1002 as far as possible may reduce a likelihood that the communication link 1006 between the relay node 1002 and the receiver node 104 is interfered with by the interfering signal 110.

Figure 14A:
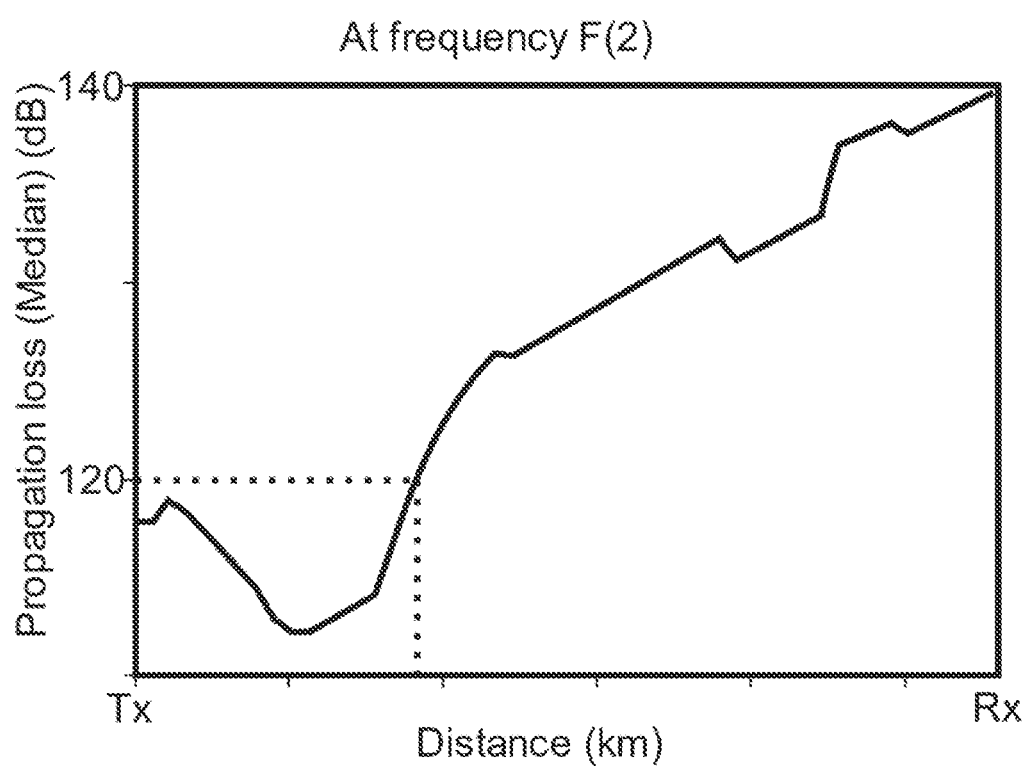
FIG. 14A depicts an exemplary graph for determining a reduction in range, in accordance with one or more embodiments of the present disclosure.

Referring now to FIG. 14A, an example of the determining the reduction in range is described. An exemplary graph of propagation loss as a function of distance is depicted. In this example, the transmitter node 102 has a highest link margin deficit of 20 dB and the propagation loss at the receiver node 104 is 140 dB. The desired propagation loss to enable the communication link 1004 between the transmitter node 102 and the relay node 1002 is determined to be 120 dB (i.e., 20 dB subtracted from 140 dB). The reduction in range is determined by finding the furthest distance from the transmitter node 102 which has the propagation loss of 120 dB.

Referring again to FIG. 13, in a step 1330, a position of the relay node 1002 is determined in a direction between the transmitter node 102 and the receiver node 104 based on the reduction in range. The direction from the transmitter node 102 to the receiver node 104 may be known. For example, the direction from the transmitter node 102 to the receiver node 104 may be determined based on the position of the transmitter node 102 and the position of the receiver node 104. The position of the relay node 1002 may be determined based on the direction from the transmitter node 102 to the receiver node 104 together with the reduction in range.

Figure 14B:
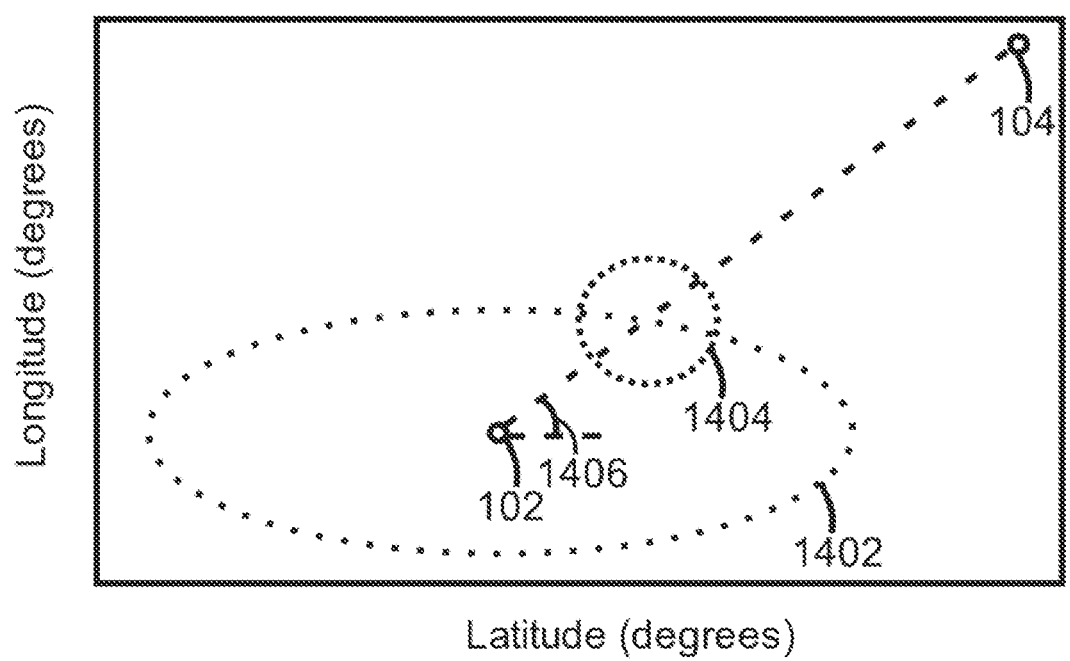
FIG. 14B depicts an exemplary graph for determining a position of relay node, in accordance with one or more embodiments of the present disclosure.

Referring now to FIG. 14B, an example of the determining the position of the relay node 1002 is described. An exemplary graph is depicted with the transmitter node 102, the receiver node 104, and a region 1404 for the relay nodes 1002. In this example, the reduction in range from the transmitter node 102 defines an ellipse 1402. The ellipse 1402 may indicate the reduction in range required to be received over the interfering signal. The ellipse 1402 may be approximated by a circle with the reduction in range being the radius of the circle. The ellipse 1402 is centered at the transmitter node 102 and includes a radius equal to the reduction in rage. The ellipse 1402 is representative of positions for the relay nodes 1002 which may receive the transmitted signals from the transmitter node 102 with a positive link margin over the interfering signals. The propagation loss from the transmitter node 102 to any position along the ellipse 1402 will be substantially similarly (e.g., within one or two dB). The transmitter node 102 may select any position along the ellipse 1402 to ensure the communication link 1004 between the transmitter node 102 and the relay node 1002. However, not all positions along the ellipse 1402 may enable the communication link 1006 between the relay node 1002 and the receiver node 104.

The distance from the relay node 1002 to the receiver node 104 may be reduced to enable the communication link 1006 between the relay node 1002 and the receiver node 104. The heading 1406 from the transmitter node 102 to the receiver node 104 is determined based on the position of the transmitter node 102 and the position of the receiver node 104. The position of the relay node 1002 is then selected by finding the intersection between the heading 1406 from the transmitter node 102 to the receiver node 104 and the ellipse 1402 defined based on the reduction in range. The intersection represents the shortest distance between the relay node 1002 and the receiver node 104. The propagation loss between the relay node 1002, placed within ellipse 1402, to the receiver node 104 is lower than the propagation loss between transmitter node 102 and receiver node 104 by the link deficit so that the signal at the receiver node 104 is greater than that delivered by the interferer node 1002.

In this example, a region 1404 is determined from the intersection. The region 1404 is centered at the intersection between the heading 1406 and the ellipse 1402. The region 1404 may represent a radius in which multiple of the receiver nodes 1002 may be placed, any of which may receive the transmitted signal. For example, a fifty-mile radius may be provided. The region 1404 may be provided to account for mission delays and the mobility of the relay nodes 1002. Any of the relay nodes 1002 within the region 1404 may be selected to enable the communication link 1004 and the communication link 1006. In some embodiments, multiple of the relay nodes 1002 may be selected within the region 1404 to account for the mission delays and the mobility.

In some embodiments, the position of the relay nodes 1002 may be selected in degree increments. For example, the position of the relay nodes 1002 may be selected in degree increments in ten-degree increments.

Referring again to FIG. 13, in a step 1340, a communication analysis is performed for the communication link 1004 and the communication link 1006. The communication analysis computes the impact of the interferer nodes 106 on the communication link 1004 and on the communication link 1006. The communication analysis may include one or more steps of the method 600. For example, the method 600 may be performed for the communication link 1004 and then performed for the communication link 1006. The position of the relay nodes 1002 may then be saved for mission placement if one or more frequencies have received a positive link margin above the received power of the interfering signals 110.

In a step 1350, an end-to-end communication using the relay node 1002. The end-to-end communication link is established between the transmitter node 102, the relay node 1002, and the receiver node 104 via the communication link 1004 and the communication link 1006.

The transmitter node 102 may send a control message to the relay node 1002. The control message establishes a session between the transmitter node 102 and the relay node 1002. The relay node 1002 may be positioned at the position a priori or may be positioned at the position in response to receive the control message. The control message also includes the frequencies for the communication link 1004 and the communication link 1006. The relay node 1002 checks if the frequencies are available. If the frequencies are available, the relay node 1002 establishes the communication link 1004. The relay node 1002 also sends a control message to the receiver node 104. The control message establishes a session between the relay node 1002 and the receiver node 104. The control message includes the frequencies for communication link 1006. The receiver node 104 checks if the frequencies are available. If the frequencies are available, the receiver node 104 establishes the communication link 1006. Thus, end-to-end communication may be established.

The relay node 1002 may be positioned at the desired position (e.g., in the region 1404) a priori or may be positioned in response to receiving the communication from the relay node 1002. For example, the transmitter node 102 may select the relay node 1002 from a list of available relay nodes based on the relay node 1002 being with the region 1404. By way of another example, the relay node 1002 may be positioned outside of the region 1404 and then travel into the region 1404. The control message from the transmitter node 102 to the relay node 1002 may include the position of the relay node 1002 causing the relay node 1002 to move to the position. In this regard, the transmitter node 102 may or may not have control over the position of the relay nodes 1002. Furthermore, positioning the relay nodes 1002 may or may not be possible. For example, the relay nodes 1002 may have to move hundreds of miles to arrive at the relay node position. The relay node may or may not be capable of moving the distance within the desired communication time.

In some embodiments, the step 1340 of performing the communication analysis is performed for the communication link 1006 may indicate there is a link margin deficit between the relay node 1002 and the receiver node 104. One or more steps of the method 1300 may be iteratively performed to add additional of the relay nodes 1002. The relay nodes 1002 may be added to reduce the link range and similarly improve the link margin. For example, the steps 1320-1340 may be iteratively performed for multiple relay communications.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A software-defined radio comprising:
   a memory maintaining program instructions; and
   one or more processors configured to execute the program instructions causing the one or more processors to:
   determine a link deficit for a first beyond line-of-sight communication link between a transmitter node and a receiver node; wherein the link deficit is a maximum deficit of a plurality of link margins for the first beyond line-of-sight communication link associated with a plurality of frequencies in a high-frequency (HF) band;
   determine a reduction in range to overcome the link margin deficit;
   determine a position of a relay node in a direction between the transmitter node and the receiver node based on the reduction in range;
   perform a direct communication analysis for a second beyond line-of-sight communication link and a third beyond line-of-sight communication link for each of the plurality of frequencies; wherein the second beyond line-of-sight communication link is between the relay node and the receiver node; wherein the third beyond line-of-sight communication link is between the transmitter node and the relay node; and
   establish an end-to-end communication link between the transmitter node the receiver node via the second beyond line-of-sight communication link and the third beyond line-of-sight communication link.

2. The software-defined radio of claim 1, wherein the program instructions cause the one or more processors to determine the reduction in range by determining a plurality of path losses for a plurality of distances between the transmitter node and the receiver node; wherein the reduction in range is one of the plurality of distances; wherein the one or more processors select the reduction in range by one of the plurality of path losses which less than a difference between a path loss at the receiver node and the maximum link deficit.

3. The software-defined radio of claim 1, wherein the program instructions cause the one or more processors to determine the position of the relay node in the direction between the transmitter node and the receiver node based on the reduction in range and based on a heading from the transmitter node to the receiver node.

4. The software-defined radio of claim 3, wherein the reduction in range defines an ellipse centered at the transmitter node; wherein the position of the relay node in the direction between the transmitter node and the receiver node is defined within a region; wherein the region is centered at an intersection between the heading and the ellipse.

5. The software-defined radio of claim 1, wherein the program instructions cause the one or more processors to perform the direct communication analysis for the second beyond line-of-sight communication link between the relay node and the receiver node by:
   determining a first lowest usable frequency (LUF) and a first maximum usable frequency (MUF), wherein the first LUF and the first MUF are from the relay node to the receiver node;
   determining a first plurality of received powers at the receiver node for the plurality of frequencies, wherein the first plurality of received powers are signals from the relay node;
   determining a second plurality of received powers at the receiver node for the plurality of frequencies, wherein the second plurality of received powers are signals from an interferer node;
   determining a first subset of the plurality of frequencies by discarding any of the plurality of frequencies which are above the first MUF and by discarding any of the plurality of frequencies which are below the first LUF;
   determining a plurality of receive sensitivities of the receiver node for each of the first subset; and
   determine a plurality of link margins between the first plurality of received powers and the second plurality of received powers.

6. The software-defined radio of claim 1, wherein the program instructions cause the one or more processors to perform the direct communication analysis for the third beyond line-of-sight communication link between the transmitter node and the relay node by:
   determining a first lowest usable frequency (LUF) and a first maximum usable frequency (MUF), wherein the first LUF and the first MUF are from the transmitter node to the relay node;
   determining a first plurality of received powers at the first relay node for the plurality of frequencies, wherein the first plurality of received powers are signals from the transmitter node;
   determining a second plurality of received powers at the first relay node for the plurality of frequencies, wherein the second plurality of received powers are signals from an interferer node;

determining a first subset of the plurality of frequencies by discarding any of the plurality of frequencies which are above the first MUF and by discarding any of the plurality of frequencies which are below the first LUF;

determining a plurality of receive sensitivities of the relay node for each of the first subset; and determine a plurality of link margins between the first plurality of received powers and the second plurality of received powers.

7. The software-defined radio of claim 1, wherein the software-defined radio is configured to cause the transmitter node to communicate with the relay node using a time division multiple access (TDMA) waveform at a first frequency.

8. The software-defined radio of claim 7, wherein the TDMA waveform is more resilient than waveform number 0 Walsh Mode defined in MIL-STD-188-110D.

9. The software-defined radio of claim 7, wherein the software defined radio is further configured to tune to the first frequency and listen for interference; detect the interference is below a threshold; and cause the transmitter node to communicate with the relay node using the TDMA waveform at the first frequency in response to detecting the interference is below the threshold.

10. The software-defined radio of claim 7, wherein the software defined radio is further configured to tune to the first frequency and listen for interference; detect the interference is above a threshold; and cause the transmitter node to communicate with the relay node using the TDMA waveform at a second frequency in response to detecting the interference is below the threshold.

* * * * *